(12) United States Patent
Clasen et al.

(10) Patent No.: US 11,255,367 B2
(45) Date of Patent: Feb. 22, 2022

(54) UNIVERSAL HUB AND PLATE ASSEMBLY FOR ATTACHING MULTIPLE GRAPHIC SYSTEMS ON A SINGLE FRAME

(71) Applicant: Optima Graphics, Inc., North Mankato, MN (US)

(72) Inventors: Robert Clasen, St. Louis, MO (US); Kevin Clobes, St. Louis, MO (US); Gary Camarato, Kirkwood, MO (US)

(73) Assignee: Taylor Print & Visual Impressions, Inc., North Mankato, MN (US)

( * ) Notice: Subject to any disclaimer, the term of this patent is extended or adjusted under 35 U.S.C. 154(b) by 0 days.

(21) Appl. No.: 16/050,916

(22) Filed: Jul. 31, 2018

(65) Prior Publication Data
US 2019/0078605 A1    Mar. 14, 2019

Related U.S. Application Data

(60) Provisional application No. 62/539,119, filed on Jul. 31, 2017.

(51) Int. Cl.
*G09F 15/00* (2006.01)
*E04B 1/19* (2006.01)
(Continued)

(52) U.S. Cl.
CPC .............. *F16B 35/06* (2013.01); *A47F 5/132* (2013.01); *E04B 1/185* (2013.01); *E04B 1/1903* (2013.01);
(Continued)

(58) Field of Classification Search
CPC .. G09F 15/0068; G09F 15/0025; F16B 35/06; F16B 17/18; F16B 17/182;
(Continued)

(56) References Cited

U.S. PATENT DOCUMENTS

| 4,512,097 A * | 4/1985 | Zeigler | G09F 15/0068 40/610 |
| 4,580,375 A * | 4/1986 | Nodskov | G09F 15/0068 40/610 |

(Continued)

*Primary Examiner* — Kyle J. Walraed-Sullivan
(74) *Attorney, Agent, or Firm* — Patterson Thuente Pedersen, P.A.

(57) ABSTRACT

A universal hub adapter for a portable display frame assembly, the hub adapter being configured to mount to an outer surface of a display hub of the frame assembly. The universal hub adapter is configured to adapt the display hub of the frame assembly between the mounting of a first graphics system including a plurality of stretched fabric panels and a second graphics system including a channeled sub-frame for mounting a larger fabric panel. The universal hub adapter can include a faceplate having a substantially planar outer surface and a concave inner surface configured to mate with the convex outer surface of the display hub and a threaded post having a threaded portion, a securement plate, a button shaft, and a button head, the threaded portion configured to pass through an aperture of the faceplate and couple to the display hub, such that the securement plate abuts up against the faceplate thereby securing the faceplate to the display hub, the button shaft and button head configured to operably couple to one of a stretched fabric panel or a sub-frame assembly.

5 Claims, 26 Drawing Sheets

(51) Int. Cl.

| | | |
|---|---|---|
| *F16B 35/06* | (2006.01) | |
| *E04B 1/18* | (2006.01) | |
| *E04H 15/64* | (2006.01) | |
| *E04H 15/50* | (2006.01) | |
| *A47F 5/13* | (2006.01) | |
| *E04B 2/74* | (2006.01) | |
| *E04H 1/12* | (2006.01) | |
| *F16B 7/04* | (2006.01) | |

(52) U.S. Cl.
CPC ......... *E04B 2/7416* (2013.01); *E04H 1/1272* (2013.01); *E04H 15/50* (2013.01); *E04H 15/64* (2013.01); *F16B 7/048* (2013.01); *G09F 15/0068* (2013.01); *E04B 2001/1963* (2013.01); *E04B 2002/7466* (2013.01); *E04B 2002/7483* (2013.01); *F16B 2200/50* (2018.08)

(58) Field of Classification Search
CPC ........ F16B 17/185; F16B 17/00; A47F 5/132; E04B 2/7416; E04B 2002/7461; E04B 2002/7462; E04B 2002/7466; E04B 2002/7479; E04B 2002/7483; E04B 1/1903; E04B 1/1912; E04H 1/1272; E04H 15/50; E04H 15/64; E04H 15/32; E06B 9/0661; E06B 9/06; E06B 3/928; Y10T 403/556; Y10T 403/66; Y10T 403/7041; Y10T 403/7062; Y10T 403/75
USPC ............ 52/646, 109; 40/610, 603; 160/377, 160/352; 135/119, 120.1, 20.3, 131, 145
See application file for complete search history.

(56) References Cited

U.S. PATENT DOCUMENTS

| | | | | |
|---|---|---|---|---|
| 4,627,210 A | * | 12/1986 | Beaulieu | A45B 25/10 135/147 |
| 4,658,560 A | * | 4/1987 | Beaulieu | E04B 1/19 211/182 |
| 4,809,471 A | * | 3/1989 | Wichman | A47F 5/14 52/109 |
| 4,888,895 A | * | 12/1989 | Kemeny | G09F 15/0068 40/610 |
| 4,896,016 A | | 1/1990 | Broberg et al. | |
| 4,942,686 A | * | 7/1990 | Kemeny | G09F 15/0068 40/610 |
| 4,986,016 A | * | 1/1991 | Wichman | E04B 1/3441 40/610 |
| 5,125,205 A | * | 6/1992 | Wichman | A47F 5/13 40/610 |
| 5,203,126 A | * | 4/1993 | Sorenson | G09F 15/0068 135/147 |
| 5,203,134 A | * | 4/1993 | Sorenson | G09F 15/0068 403/172 |
| 5,351,843 A | * | 10/1994 | Wichman | E04H 12/185 211/182 |
| 5,501,051 A | * | 3/1996 | Harlan | G09F 15/0068 160/135 |
| 5,560,502 A | * | 10/1996 | Hsiung | A47B 43/04 211/195 |
| 5,624,200 A | * | 4/1997 | Beaulieu | A47B 47/0033 248/222.52 |
| 5,797,695 A | * | 8/1998 | Prusmack | E04H 15/32 135/145 |
| 5,826,397 A | * | 10/1998 | Armold | G09F 15/0068 52/646 |
| 6,244,011 B1 | * | 6/2001 | Esser | G09F 15/0056 135/131 |
| 6,250,039 B1 | * | 6/2001 | Karten | G09F 15/0068 40/610 |
| 6,553,698 B1 | * | 4/2003 | Kemeny | G09F 15/0068 160/135 |
| 6,829,869 B1 | * | 12/2004 | Savoie | G09F 15/0068 135/122 |
| 6,981,350 B1 | * | 1/2006 | Redmon | G09F 15/0062 359/443 |
| 7,191,555 B2 | * | 3/2007 | Hughes | G09F 15/0025 160/368.1 |
| D630,266 S | * | 1/2011 | Frank | A63J 19/00 D21/506 |
| 8,931,157 B2 | | 1/2015 | Hughes | |
| 9,697,755 B1 | * | 7/2017 | Zhang | G09F 15/0012 |
| 10,431,130 B2 | * | 10/2019 | McPhillips | G09F 15/0068 |
| 2004/0074123 A1 | * | 4/2004 | Pritchard | G09F 15/0068 40/610 |
| 2006/0174525 A1 | * | 8/2006 | Hughes | G09F 15/0025 40/603 |
| 2008/0155873 A1 | * | 7/2008 | Fritsche | G09F 15/0062 40/610 |
| 2010/0146834 A1 | * | 6/2010 | Fritsche | G09F 15/0062 40/606.12 |
| 2011/0168220 A1 | * | 7/2011 | Prusmack | E04B 1/32 135/135 |
| 2011/0250034 A1 | * | 10/2011 | Swanson | F16B 5/0692 411/103 |
| 2014/0197124 A1 | * | 7/2014 | McPhillips | G09F 15/0068 211/195 |
| 2017/0330493 A1 | * | 11/2017 | Zhang | G09F 13/04 |
| 2018/0274265 A1 | * | 9/2018 | Wang | E05B 17/22 |

* cited by examiner

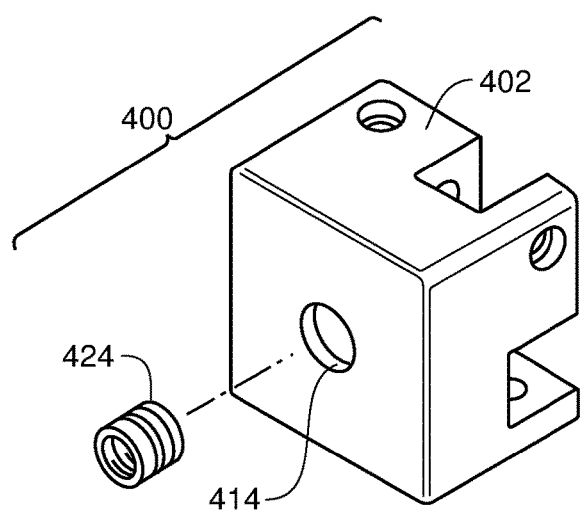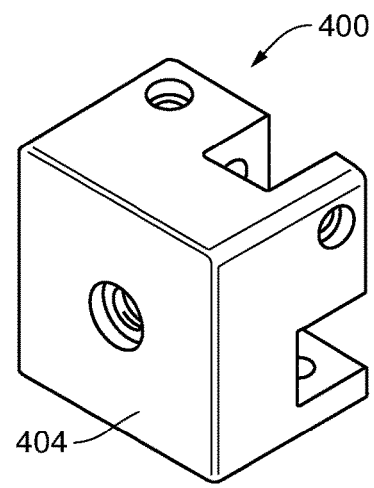
*FIG. 8A*   *FIG. 8B*
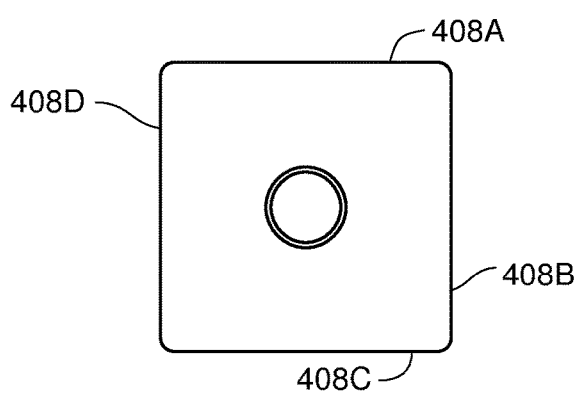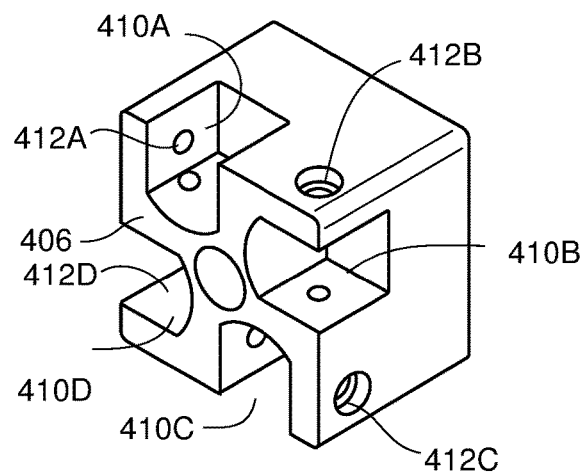
*FIG. 8C*   *FIG. 8D*
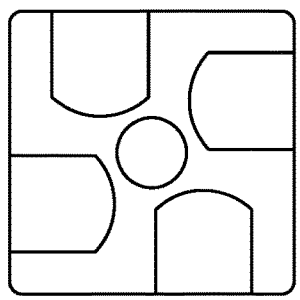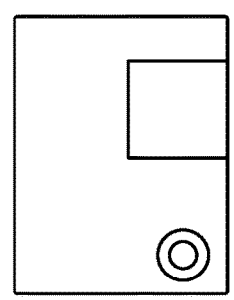
*FIG. 8E*   *FIG. 8F*

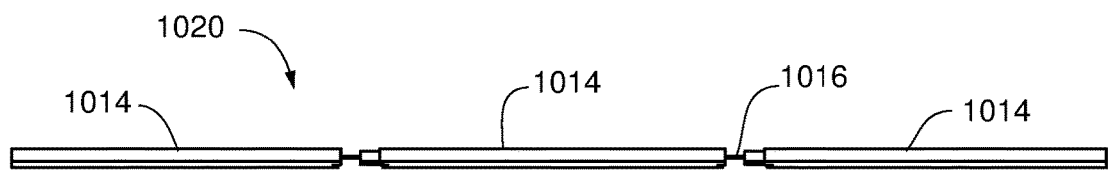
FIG. 12D
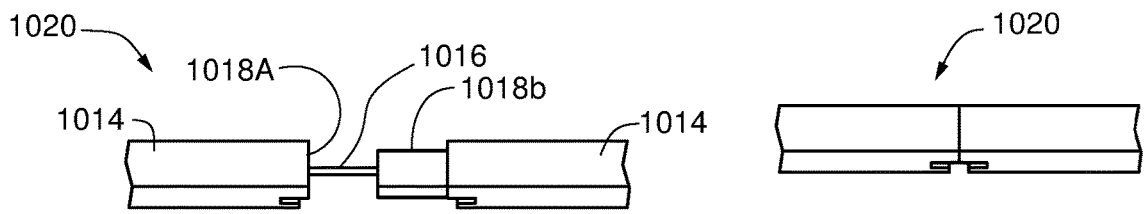
FIG. 12E
FIG. 12F
FIG. 12G
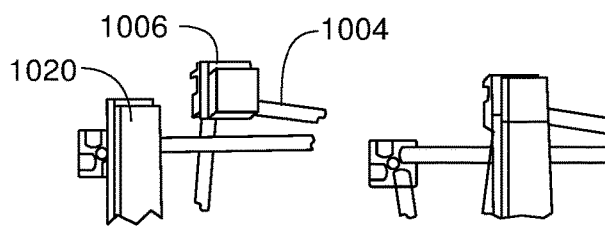
FIG. 12H
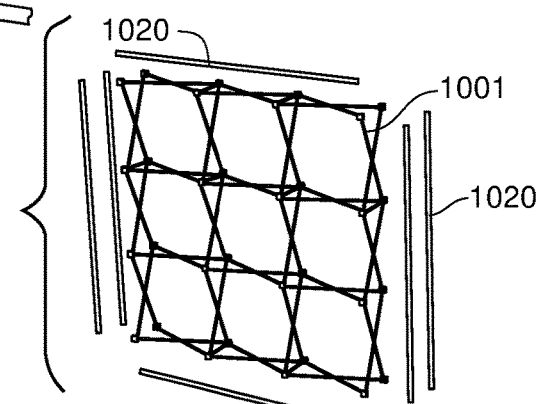
FIG. 12I
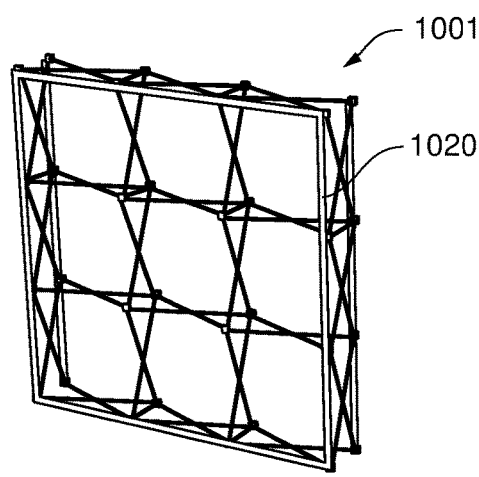
FIG. 12J ered to as a Silicon Edge
UNIVERSAL HUB AND PLATE ASSEMBLY FOR ATTACHING MULTIPLE GRAPHIC SYSTEMS ON A SINGLE FRAME

RELATED APPLICATION

The present application claims the benefit of U.S. Provisional Application No. 62/539,119 filed Jul. 31, 2017, which is hereby incorporated herein in its entirety by reference.

TECHNICAL FIELD

The present disclosure relates to portable fabric display panels mountable on a collapsible frame for displaying graphical images, and more particularly to universal hub assemblies for attaching multiple graphic systems onto a single collapsible frame.

BACKGROUND

Many different display systems which are both portable and collapsible are known to those in the art. These systems typically include a scissors frame assembly having a plurality of elongate arms attached at their ends to hubs which enable the frame to transition between a collapsed, storage position and an expanded, display position. Such systems are commonly used for sales and/or trade show purposes, as they are lightweight and can readily be collapsed into a fraction of its display position size for ease in transportation.

FIGS. 1A-1C depict a first portable display system 100 of the prior art. The portable display system 100 can include a pop-up scissors frame 101 comprising an array of box frames 102, wherein the edge of each box frame 102 is defined by a pair of crossed elongate arms 104A-104B. Each of the elongate arms 104 is pivotably coupled to a hub 106 at its respective end. Opposing hubs 106A, 106C, defining one corner of the box frame 102, can be held apart in the display position by a cross member 108A.

The respective edges of adjacent box frames 102 can share pairs of crossed elongate arms 104 along a common border. Accordingly, as depicted, a hub 106A located on a corner of the perimeter of the first portable display system 100 is operably coupled to two elongate arms 104A, 104C and one cross member 108A. A hub 106B located along an edge of the perimeter of the first portable display system 100 is operably coupled to three elongate arms 104B, 104D, and 104E, and one cross member 108B. A hub 106E located interior to the perimeter of the first portable display system 100 is operably coupled to four elongate arms 104E, 104F, 104G, and 104H, and one cross member 108C. Other configurations of the first portable display system 100, including configurations other than an array of nine square box frames 102 are also possible.

As depicted in FIG. 1B, the outwardly facing surface 110 of the hub 106 can have a convex or curvilinear shape, having a knob or post 112 extending therefrom. As depicted in FIG. 1C, a stretchable fabric 114 can be operably coupled to the post 112, for example by a buttonhole 116 defined within each corner of the fabric 114. As depicted in FIG. 1A, when the buttonholes 116 are attached to the respective hubs 106, the fabric 114 stretches, so as to cause the sides of the fabric 114 to appear to arch inwardly.

FIG. 2A-2B depict a second portable display system 150 of the prior art. Like the previous example, this portable display system 150 can include a pop-up scissors frame 151 comprising an array of box frames 102 including a plurality of hubs 117. However, instead a plurality of stretchable fabric panels attached to the hubs 117, a sub-frame 118 configured to support a single large fabric panel 120 is attached to the outer perimeter of the display system 150.

As depicted in FIG. 2B, the frame 118 can define a channel 122, and fabric panel 120 can include an edge 124 configured to fit within the channel 122. With the edge 124 securely positioned within the channel 122, fabric panel 120 can be stretched across the frame 118 for display. In some examples, commercially referred to as a Silicon Edge Graphics (SEG) frame, the edge 124 can further include a layer of silicone, which in combination with the elasticity of the fabric panel 120 can aid in the retention of the edge 124 within the channel 122. One advantage of the single fabric panel 120 is that the edges of the fabric panel 120 do not arch inward like the fabric panels 114 of the first portable display system 100; accordingly, the image on the single fabric panel 120 is not distorted during display.

Presently, the hubs 106 of the first portable display system 100 are not compatible with the frame 118 of the second portable hub display system 150; that is, the frame 118 cannot be mounted to the hubs 106 of the first portable display system 100. Likewise, the hubs 117 of the second portable display system 150 do not include knobs or posts 112 for connection to the buttonholes 116 of the stretchable fabric 114 of the first portable display system 100. Moreover, the hubs 106, 117 are not interchangeable between the first and second portable display systems 100, 150. Therefore, users who wish to utilize a multiple panel display system must purchase one display system 100, while users who wish to display a single large panel must purchase a second, separate display system 150.

Accordingly, what is needed in the industry is a single portable display system capable of displaying both a plurality of stretchable fabric panels, as well as a large framed panel.

SUMMARY

Embodiments of the present disclosure provide a universal portable display system capable of interchangeably displaying both a plurality of stretchable fabric panels, as well as one or more sections of a sub-frame for a displaying a larger graphic panel. Moreover, embodiments of the present disclosure provide an adapter kit to enable collapsible frames of the prior art to support multiple display graphic systems including a first graphics system including a plurality of stretchable fabric panels, and a second graphic system including a sub-frame, such as a silicon edge frame comprising a plurality of channel bars, for mounting a single larger fabric panel or other graphic panel to the frame assembly. Other embodiments are directed to portable display systems which incorporate universal hubs within a matrix of collapsible elongate support arms at each connection point of the arms, the hubs allowing the system to be shiftable between a first graphics system including a plurality of stretchable fabric panels, and a second graphic system including a sub-frame, such as a silicon edge frame comprising a plurality of channel bars, for mounting a single larger fabric panel or other graphic panel to the frame assembly.

One embodiment of the present disclosure provides a universal hub adapter for a portable display system configured to mount to a convex outer surface of a display hub, the universal hub adapter configured to interchangeably adapt the display hub for the mounting, on a single frame assembly, of a first graphics system including a plurality of stretched fabric panels and a second graphics system including a sub-frame assembly for mounting a larger fabric panel. The universal hub adapter generally includes a faceplate and a threaded post, the faceplate having a substantially planar outer surface and a concave inner surface configured to mate with the convex outer surface of the display hub. The threaded post generally includes a threaded portion, a securement plate, a button shaft, and a button head. The threaded portion is configured to pass through an aperture of the faceplate and couple to the display hub, such that the securement plate abuts up against the faceplate, thereby securing the faceplate to the display hub. The button shaft and button head are configured to operably couple to one of a stretched fabric panel or a sub-frame assembly.

Another embodiment of the present disclosure provides a universal hub for a portable display frame, the portable display frame including a plurality of elongate arms pivotably coupled to the universal hub assembly by respective plurality of pivot fasteners. The universal hub assembly is configured to enable the mounting, on a single frame assembly, of a first graphics system including a plurality of stretched fabric panels and a second graphics system including a sub-frame assembly for mounting a larger fabric panel. The universal hub assembly generally includes a substantially rectangular prism shaped hub component, a rigid threaded insert, and a threaded post. The substantially rectangular prism shaped hub component has an outer surface, an inner surface, and four side surfaces. The inner surface and the four side surfaces define a plurality of grooves shaped and sized to accommodate the ends of a plurality of elongate arms of the portable display frame. Each of the respective side surfaces further define an aperture shaped and sized to accommodate one of a respective plurality of pivot fasteners for an elongate arm fitting within an adjacent groove, so as to pivotably couple each elongate arm to the hub component. The hub component further defines a through bore passing from the outer surface to the inner surface. The rigid threaded insert is housed within the through bore. The threaded post includes a threaded portion, a securement plate, a button shaft, and a button head. The threaded portion is configured to threadedly couple to the threaded insert, such that the securement plate abuts up against the outer surface of the hub component. The button shaft and button head are configured to operably couple to one of a stretched fabric panel or a sub-frame assembly.

Another embodiment of the present disclosure provides a universal hub assembly for a portable display frame, the portable display frame including a plurality of elongate arms pivotably coupled to the universal hub assembly by plurality of pivot fasteners. The universal hub assembly is configured to enable the mounting, on a single frame assembly, of a first graphics system including a plurality of stretched fabric panels and a second graphics system including a sub-frame assembly for mounting a larger fabric panel. The universal hub assembly generally includes a six sided hub component, a rigid threaded insert, a faceplate, and a threaded post. The six sided hub component has an outer surface, an inner surface, and four side surfaces, wherein a keyed boss extends from the outer surface. The inner surface and four side surfaces define a plurality of grooves shaped and sized to accommodate ends of a plurality of elongate arms of the portable display frame. Each of the respective side surfaces further define an aperture shaped and sized to accommodate one of a respective plurality of pivot fasteners for an elongate arm fitting within an adjacent groove, so as to pivotably couple each elongate arm to the hub component. The hub component further defines a through bore passing from the keyed boss to the inner surface. The rigid threaded insert is housed within the through bore. The faceplate can include a substantially planar outer surface and an inner surface shaped and sized to mate with the keyed boss of the hub component. The threaded post includes a threaded portion, a securement plate, a button shaft, and a button head. The threaded portion is configured to pass through an aperture of the faceplate and threadedly couple to the threaded insert, such that the securement plate abuts up against the faceplate, thereby securing the faceplate to the hub component. The button shaft and button head are configured to operably couple to one of a stretched fabric panel or a frame assembly.

In embodiments, the universal hub adaptors and universal hubs described herein can be used, for example, to shift a portable pop up frame assembly between a multi-panel graphic display assembly in which a plurality of graphics panels are coupled via the button heads to the frame assembly, and a single panel graphic display assembly in which a plurality of channel bars are coupleable to the universal hubs by inserting the button head into an aperture or channel formed in each channel bar to form a sub-frame for mounting the larger fabric panel thereto. The universal hubs and adaptors used in pop-up frame assemblies allow not only conversion between single panel and multi-panel graphic frame assemblies, but also allow for modularity of the system. For example, frame assemblies using the universal hubs described herein can be coupled together in a variety of configurations, including closets, storage spaces, and the like. The modularity and ability to convert the frame assemblies between different graphic systems allows for less inventory from both a seller's perspective and buyer's perspective, and can give a user a variety of configurations and uses.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIGS. 8A-8F are various views depicting a universal hub assembly (less a threaded post) in accordance with an embodiment of the disclosure.

Figure 1A:
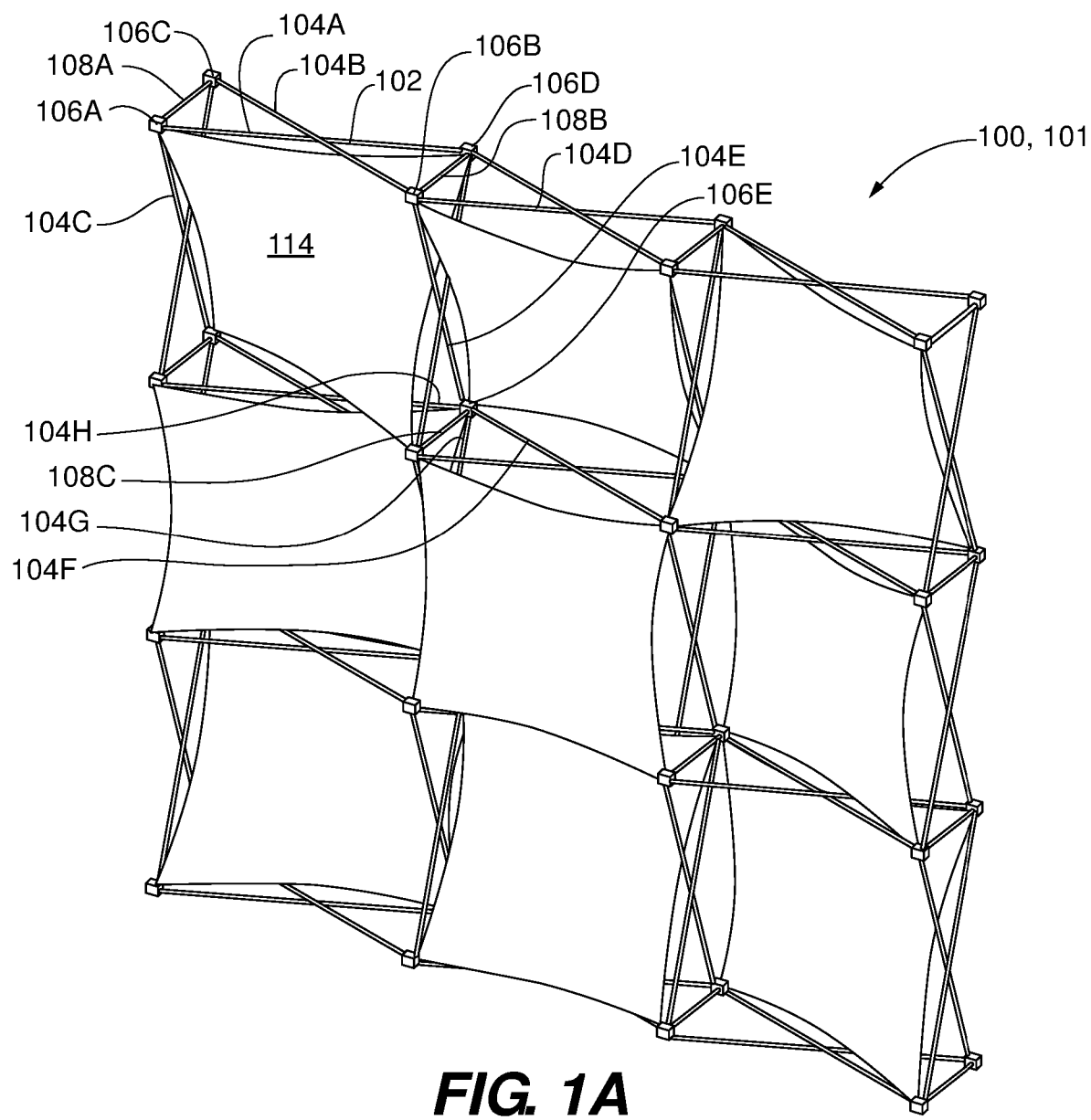
FIG. 1A is a perspective view depicting a first portable display system of the prior art.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

A. Adapter Kits for Hubs of the Prior Art

Referring to FIGS. 3A-3F, a faceplate 202 is depicted in accordance with an embodiment of the disclosure. In one embodiment, the faceplate 202 has an outer surface 204, an inner surface 206, and four side surfaces 208A-208D substantially perpendicular to the outer surface 204 and the inner surface 206, so that the four side surfaces 208A-208D form a square. In other embodiments, the side surfaces 208 can form a triangle, hexagon, octagon, rhombus, trapezoid or other polygon, or the side surfaces 208 can be curved to form a circle, oval or ellipse.

Figure 1B:
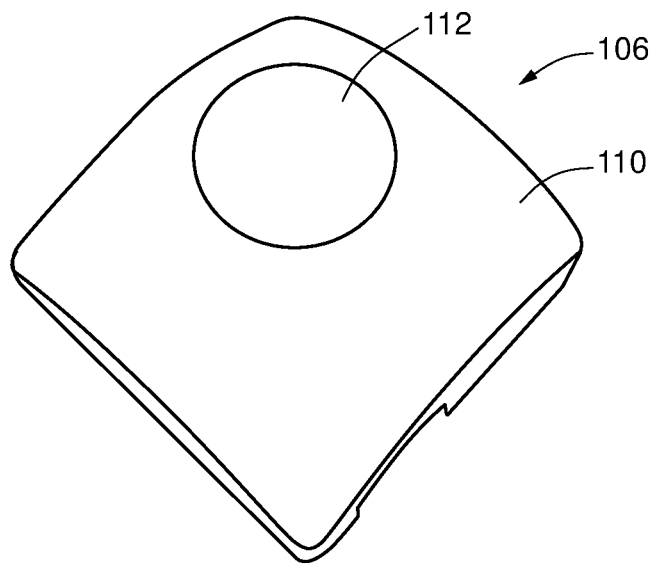
FIG. 1B is a perspective view of a hub of the first portable display system of FIG. 1A.
Figure 1C:
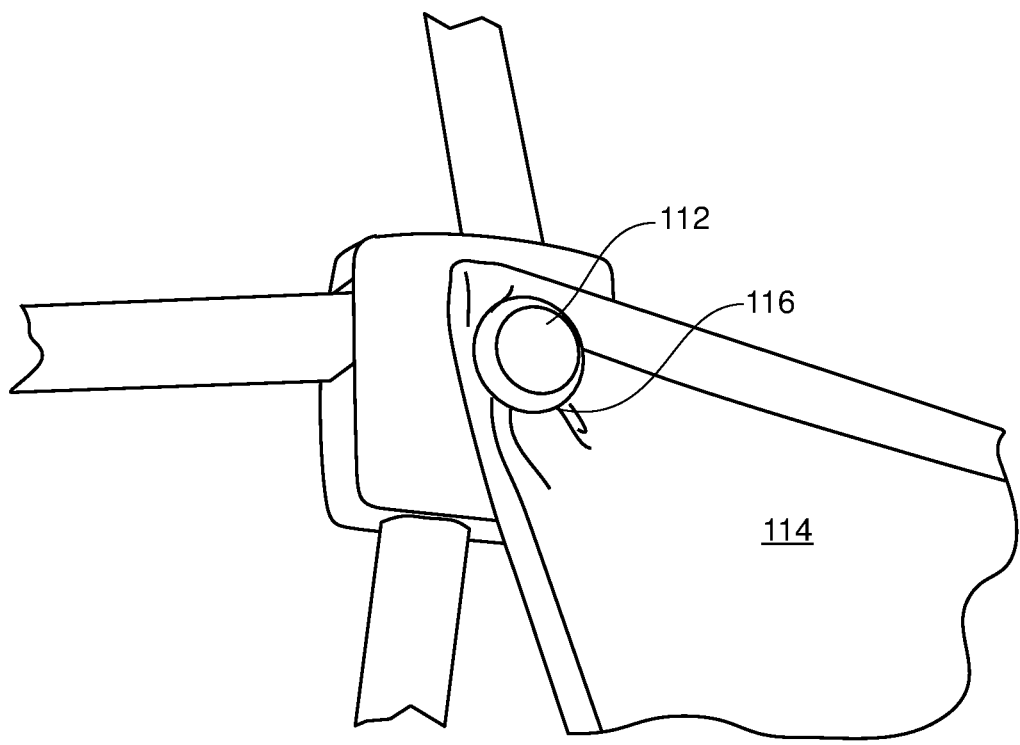
FIG. 1C is a perspective view depicting the coupling of stretchable fabric to a hub of the first portable display system of FIG. 1A.
Figure 2A:
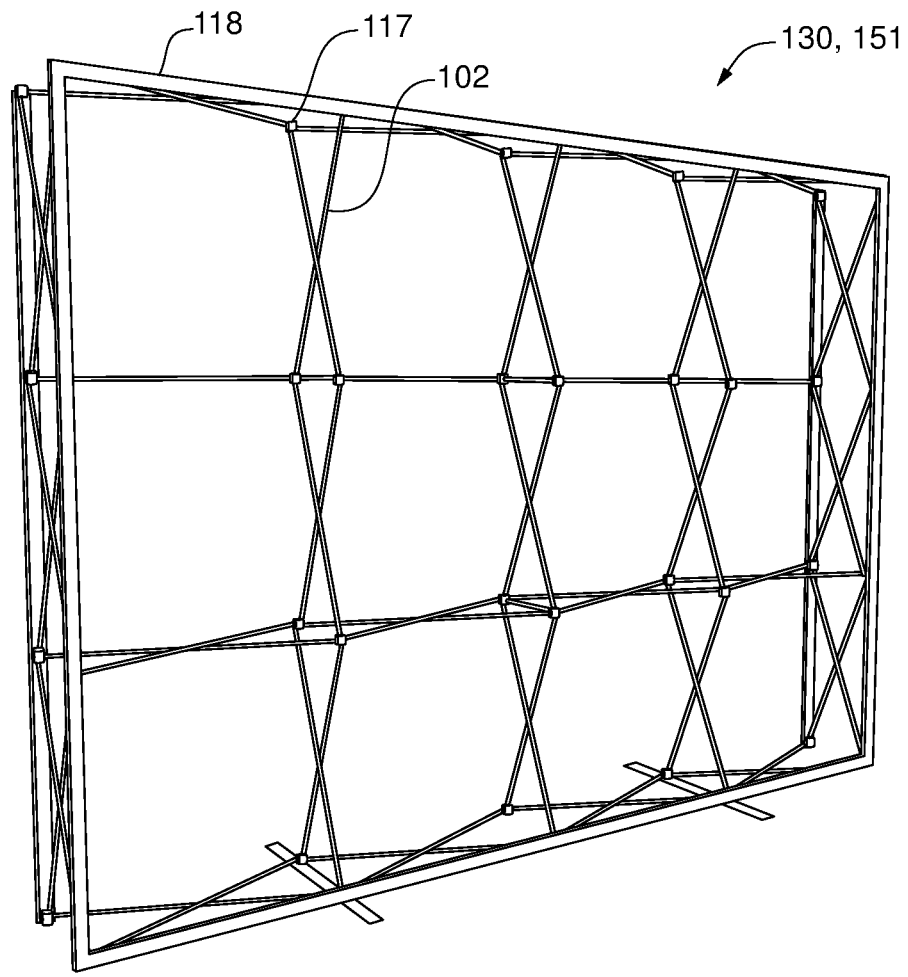
FIG. 2A is a perspective view depicting a second portable display system of the prior art.
Figure 2B:
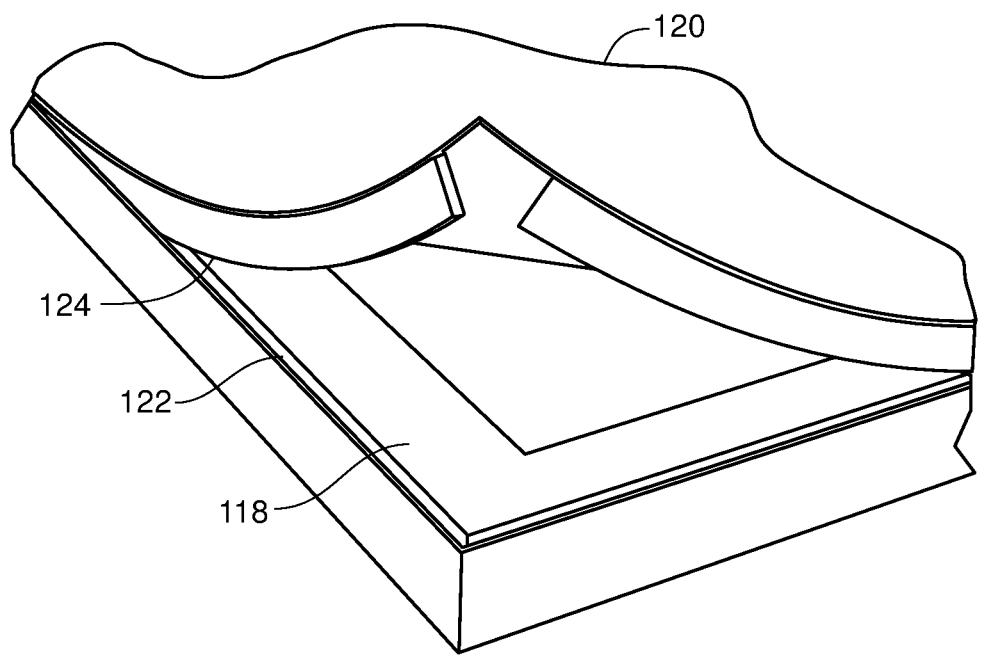
FIG. 2B is a close-up perspective view depicting the coupling of fabric to the frame of the second portable display system of FIG. 2A.
Figure 3A:
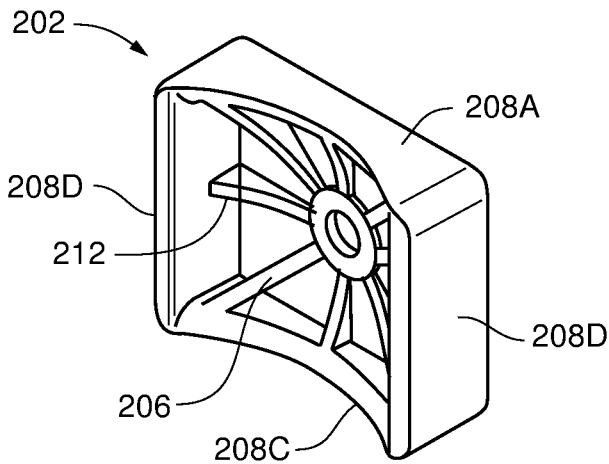
FIGS. 3A-3F are various views depicting a faceplate in accordance with an embodiment of the disclosure.
Figure 3B:
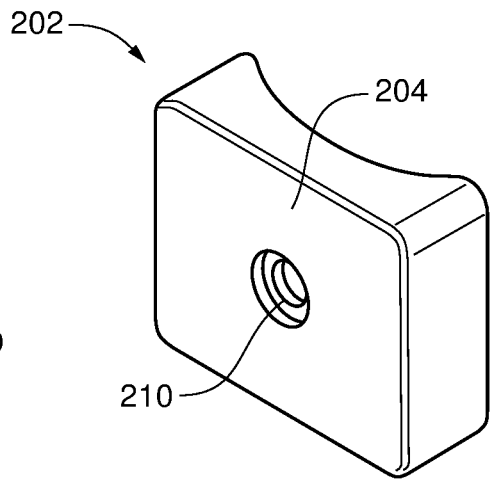
Figure 3C:
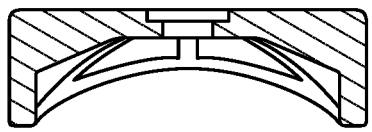
Figure 3D:
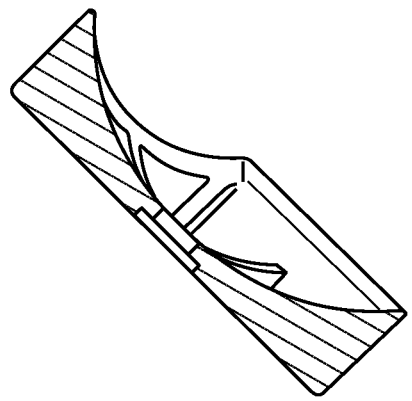
Figure 3E:
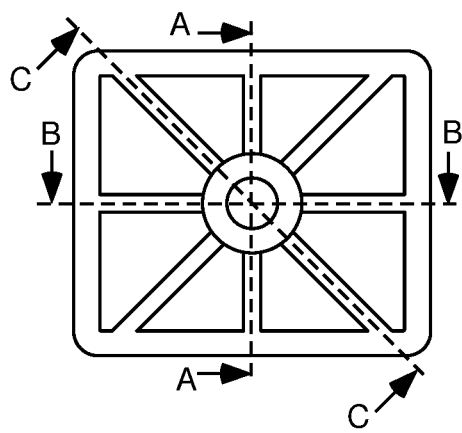
Figure 3F:
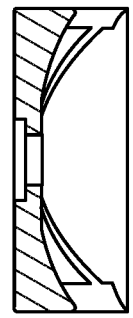
Figure 4A:
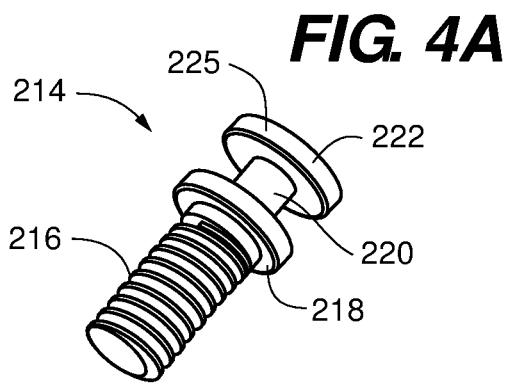
FIGS. 4A-4E are various views depicting a threaded post in accordance with an embodiment of the disclosure.
Figure 4B:
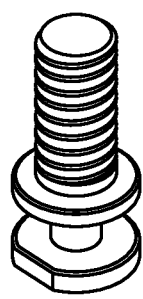
Figure 4C:
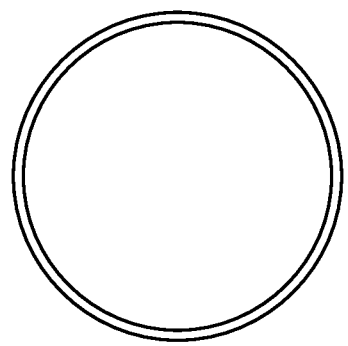
Figure 4D:
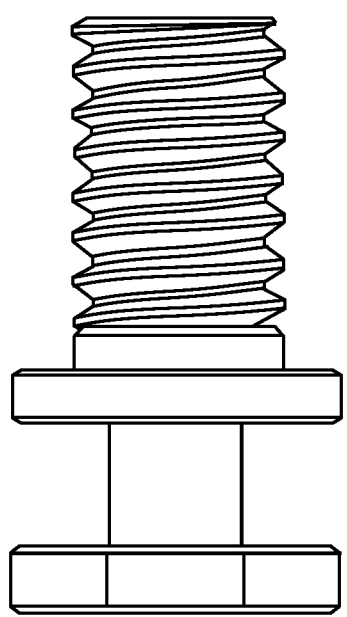
Figure 4E:
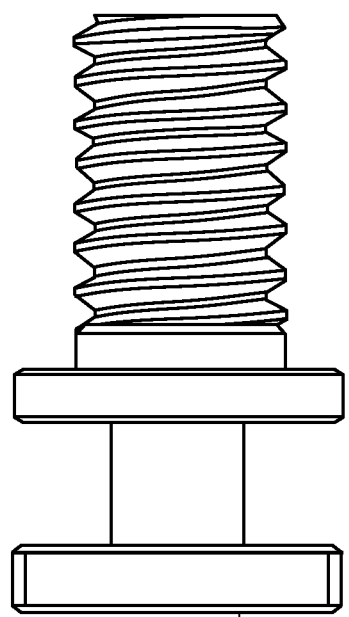

In one embodiment, the outer surface 204 can be substantially planar. The inner surface 206 can be concave, so as to mate with a convex outer surface 110 of a display hub 106 of a portable display system of the prior art (as depicted in FIG. 1A-1C). A through bore 210 can be defined within the faceplate 202, so as to pass from the outer surface 204 to the inner surface 206. In some embodiments, the faceplate 202 can include a web structure 212 to aid in providing structural integrity to the faceplate 202. For example, in one embodiment, the inner surface 206 can include eight support members. In some embodiments, the web structure 212 can define a portion of the concave shape of the inner surface 206. For example, in one embodiment, the web structure 212 can have a concave diameter of approximately 1.46 inches; in other embodiments a diameter of the concave surface can measure between approximately 0.96 and 1.96 inches.

Embodiments of the faceplate 202 can be constructed of steel, stainless steel, aluminum, metal alloys, resin and/or plastic, such as polypropylene, ABS, or other plastics. The faceplate 202 can include an anodized coating and can be configured in a variety of colors, including black, white, gray, neutrals, and primary colors. In one embodiment, the size of the faceplate 202 is dictated by its connection to elongate arms 106 and crossmember 108, and/or the function that the faceplate 202 is configured to perform. For example, in one embodiment the faceplate 202 can have an outer dimension measuring approximately 1.8 inches; in other embodiments the outer dimension can measure between approximately 1.3 and 2.3 inches. In one embodiment, a thickness of the faceplate can measure approximately 0.595 inches; in other embodiments, the thickness can measure between approximately 0.345 and 0.845 inches. Embodiments of the faceplate 202 can be configured to function as part of a hook and loop fastener attachment surface, a magnetic attachment surface, a surface for connecting silicon edge graphics, a surface for universal frame attachment, or a surface for connection to a threaded post and/or button head.

Referring to FIGS. 4A-4E, a threaded post 214 is depicted in accordance with an embodiment of the disclosure. In one embodiment, the threaded post 214 can include a threaded portion 216, a securement plate 218, a button shaft 220, and a button head 222. Embodiments of the threaded post 214 can be constructed of steel, stainless steel, aluminum, metal alloys, resin and/or plastic, such as polypropylene, ABS, or other plastics. The threaded post 214 can include an anodized coating and can be configured in a variety of colors, including black, white, gray, neutrals, and primary colors.

In one embodiment, the threaded portion 216 of the threaded post 214 is dimensioned as ¼-20, although other dimensions of the threaded portion 216 are also contemplated. In one embodiment, the threaded post 216 can measure approximately 0.42 inches in length. In another embodiment, the threaded portion 216 can be replaced by another mechanism configured to fasten or secure the threaded post 214 to the faceplate 202.

In one embodiment, the securement plate 218 can have a circular outer diameter measuring approximately 0.36 inches, and can have a depth measuring approximately 0.07 inches. The button shaft 220 can measure approximately 0.151 inches in length, and can have an outer diameter measuring approximately 0.394 inches.

The button head 222 can have an outer dimension measuring approximately 0.36 inches, and can have a depth measuring approximately 0.079 inches. The top surface 223 of the button head 222 can be substantially flat, or the top surface 223 can be curved or rounded in shape. In some embodiments, the button head 222 can include one or more flat surfaces 225 on an outer diameter of the button head 222 configured to improve grip when installing and removing the threaded post 214 from the faceplate 202.

In some embodiments, the securement plate 218 and/or button head 222 can be circular in shape. In other embodiments, the securement plate 218 and/or button head 222 can be configured as a triangle, square, hexagon, octagon, rhombus, trapezoid, polygon, oval, or ellipse. In some embodiments, the shape of the securement plate 218 and/or button head 222 can be configured to accommodate at least one of a specific style of graphic system. For example, in some embodiments, the threaded post 214 can be configured to operably coupled to fabric 114 or a silicon edge graphics frame 118 that is either curved or straight. In some embodiments, the threaded post 214 can be used with magnets and hanger bars to accept graphic systems.

In one embodiment, the threaded portion 216 and the securement plate 218 can be formed as a first portion, and the button shaft 220 and button head 222 can be formed as a second portion, such that the first portion can be operably coupled to the second portion. For example, a portion of the button shaft 222 can be fastened to the securement plate 228.

Figure 5:
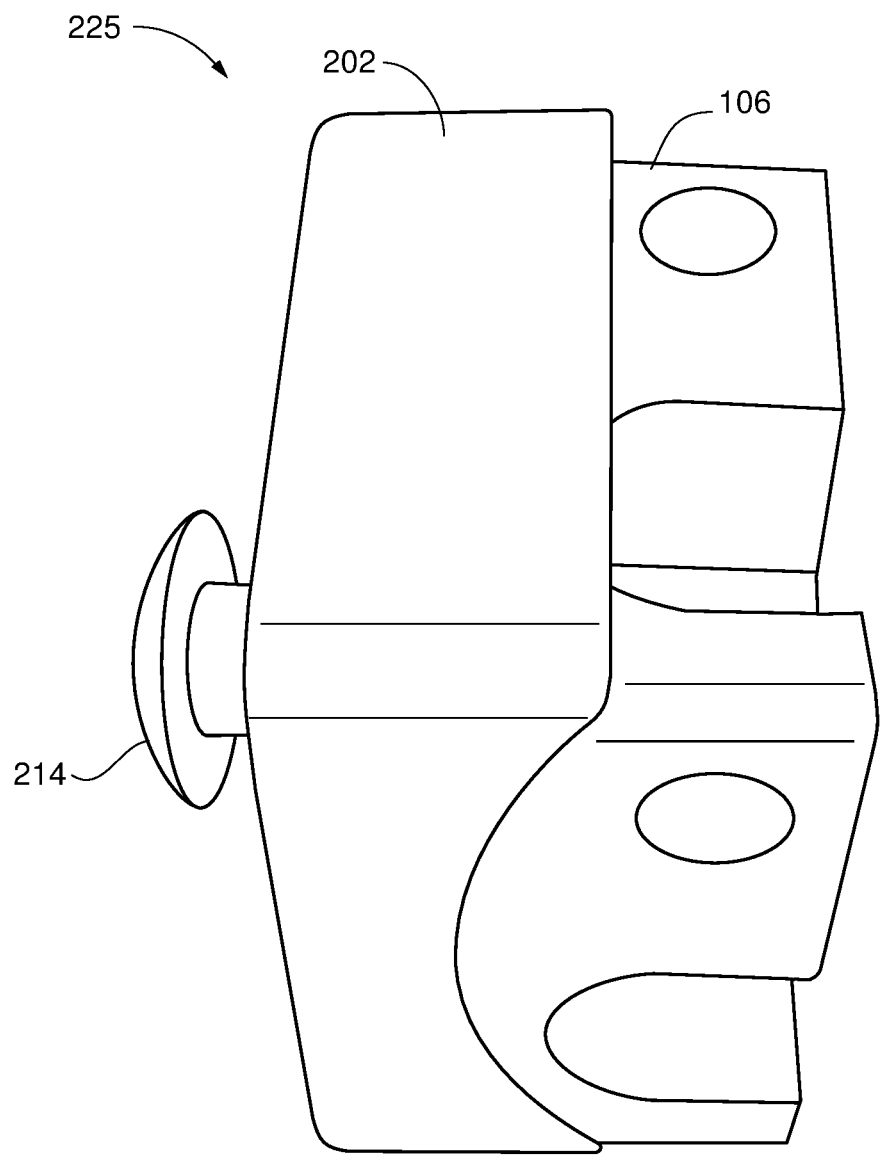
FIG. 5 is a perspective view depicting a universal hub adapter assembly in accordance with an embodiment of the disclosure.
Figure 6A:
FIGS. 6A-6F are various views depicting a faceplate in accordance with an embodiment of the disclosure.
Figure 6B:
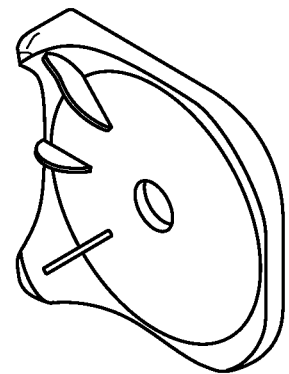
Figure 6C:
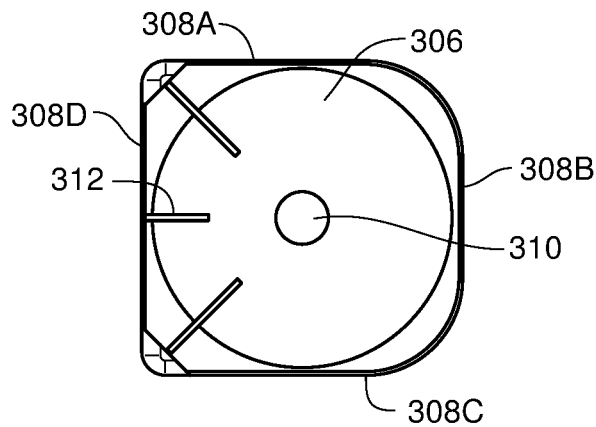
Figure 6D:
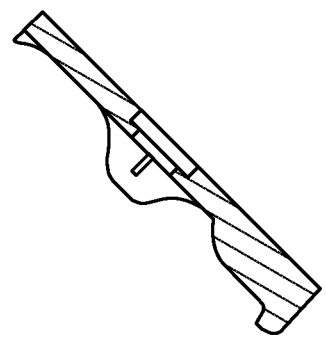
Figure 6E:
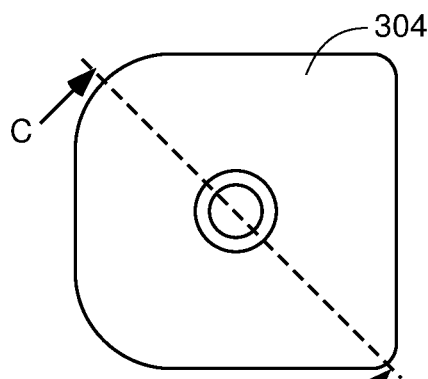
Figure 6F:
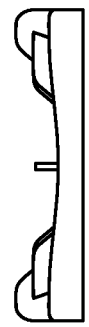
Figure 7A:
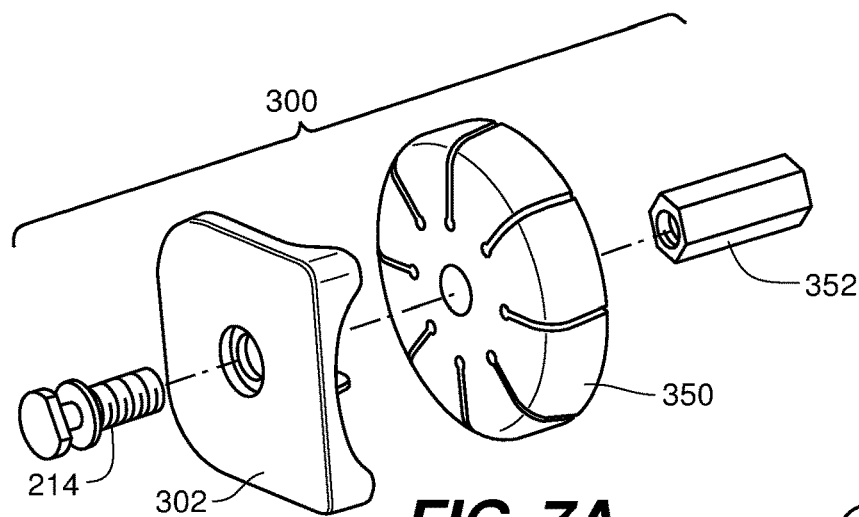
FIGS. 7A-7D are various views depicting a universal hub adapter assembly in accordance with an embodiment of the disclosure.
Figure 7B:
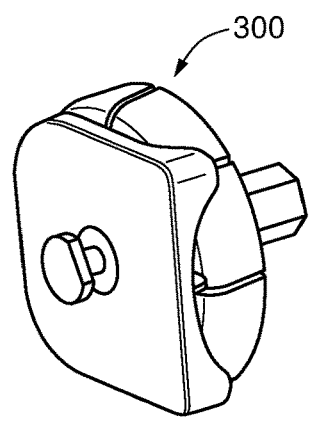
Figure 7C:
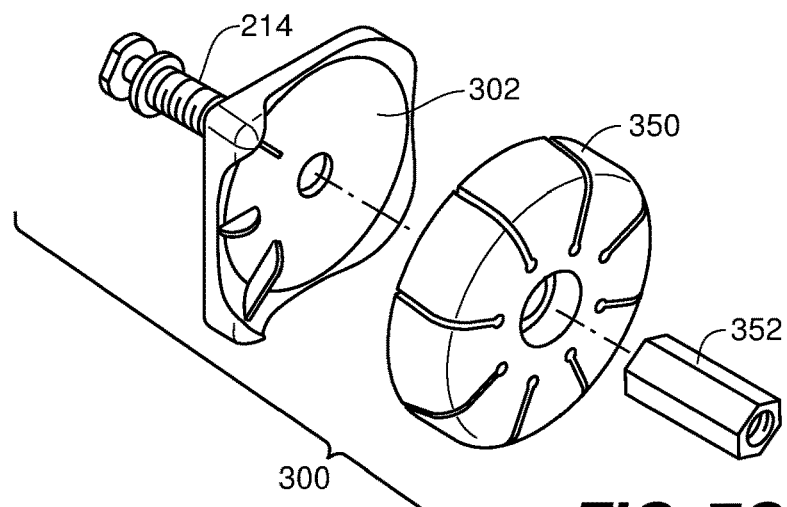
Figure 7D:
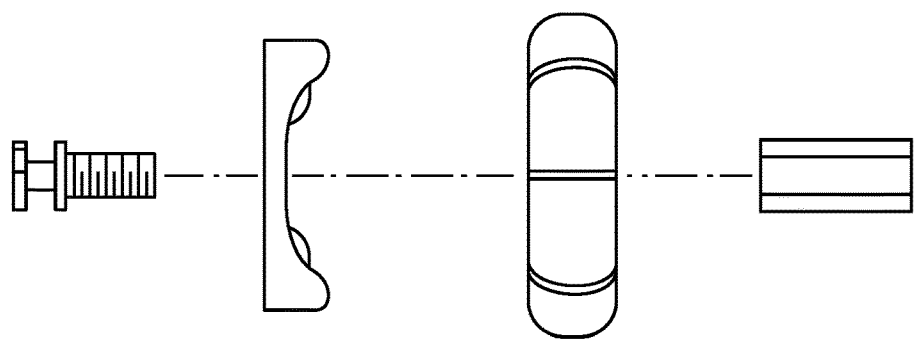
Figure 9A:
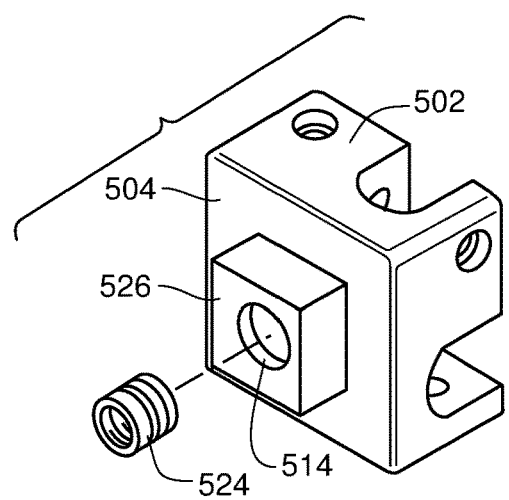
FIGS. 9A-9F are various views depicting a hub component and threaded insert in accordance with an embodiment of the disclosure.
Figure 9B:
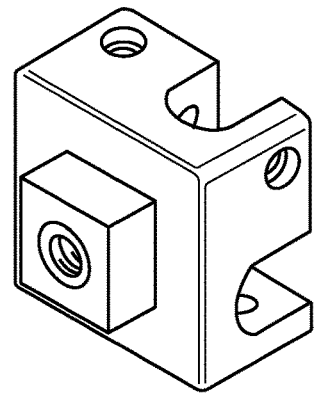
Figure 9C:
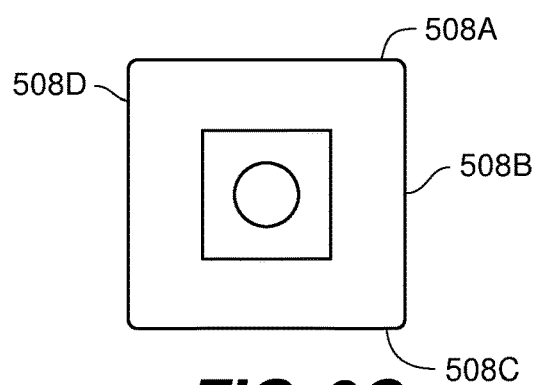
Figure 9D:
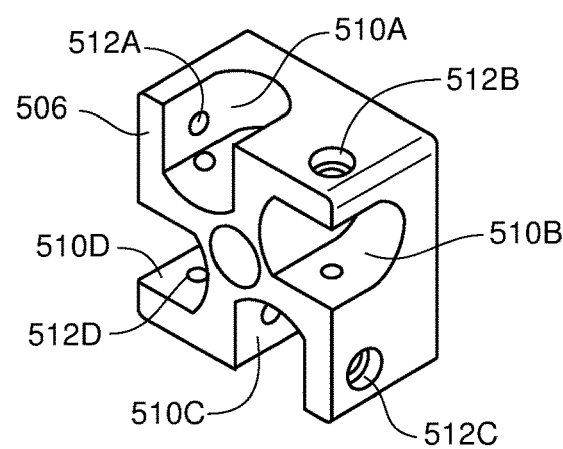
Figure 9E:
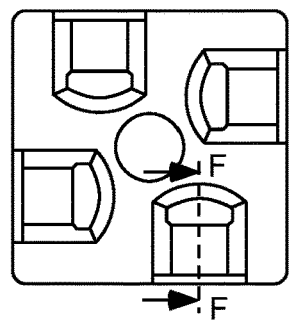
Figure 9F:
Figure 10A:
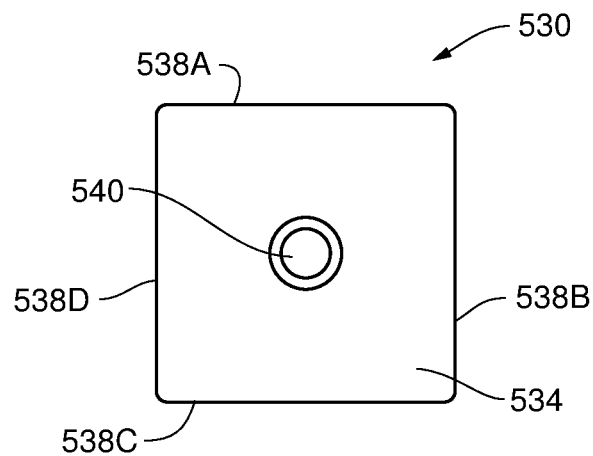
FIGS. 10A-10D are various views depicting a faceplate in accordance with an embodiment of the disclosure.
Figure 10B:
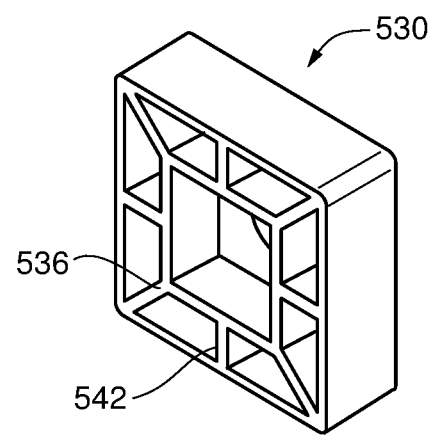
Figure 10C:
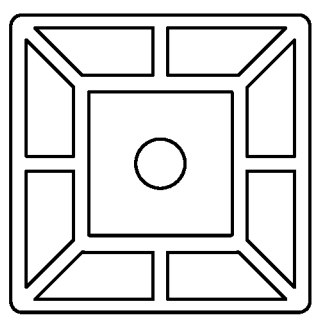
Figure 10D:
Figure 11A:
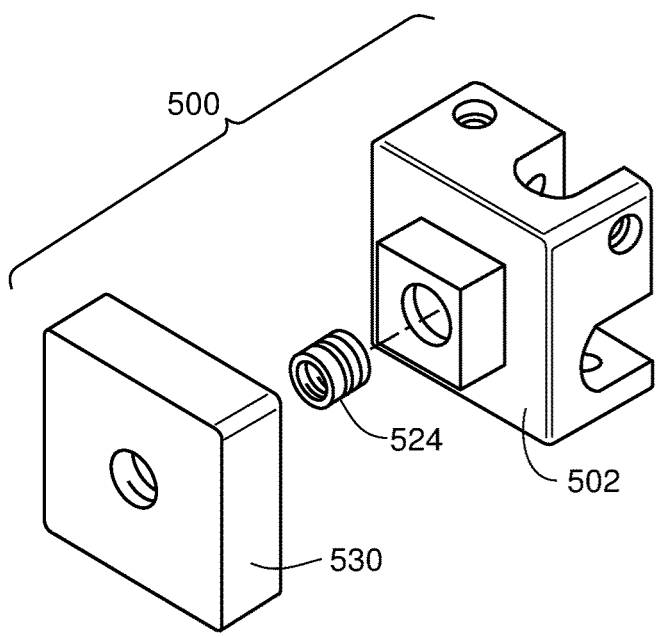
FIGS. 11A-11E are various views depicting a universal hub assembly (less a threaded post) in accordance with an embodiment of the disclosure.
Figure 11B:
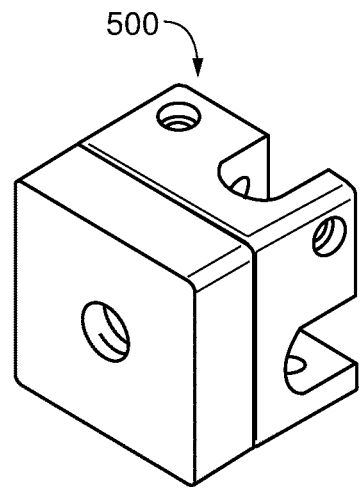
Figure 11C:
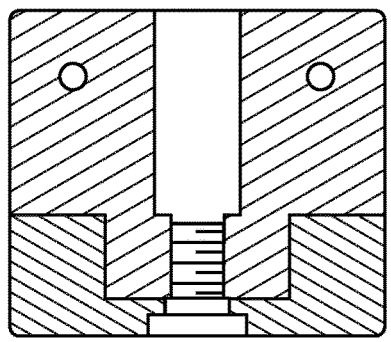
Figure 11D:
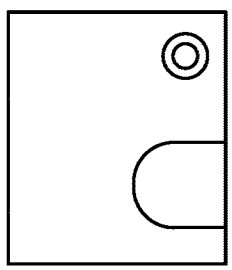
Figure 11E:
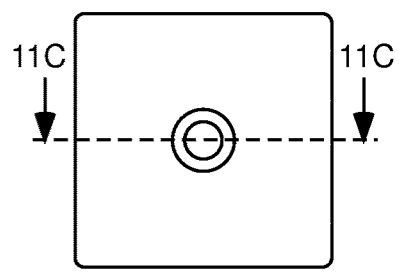

Referring to FIG. 5, a universal hub adapter assembly 200 is depicted in accordance with an embodiment of the disclosure. The universal hub adapter assembly 200 can include a display hub 106, a faceplate 202, and a threaded post 214. In one embodiment, the threaded portion 216 of the threaded post 214 can be configured to pass through the aperture or through bore 210 of the faceplate 202 and threadedly couple to the display hub 106, such that the securement plate 218 abuts up against the faceplate 202, thereby securing the faceplate 202 to the display hub 106. The button shaft 220 and button head 222 can be configured to be operably coupled to one of a stretched fabric panel 114 or a frame 118. Accordingly, the universal hub adapter assembly 200 can be configured to adapt a conventional portable display system for the mounting of a plurality of stretched fabric panels 114 or a sub-frame assembly 118 for a larger fabric panel.

Referring to FIGS. 6A-6F, a faceplate 302 is depicted in accordance with an embodiment of the disclosure. In one embodiment, the faceplate 302 has an outer surface 304, an inner surface 306, and four side surfaces 308A-308D substantially perpendicular to the outer surface 304 and the inner surface 306, so that the four side surfaces 308A-308D form a square. In other embodiments, the side surfaces 308 can form a triangle, hexagon, octagon, rhombus, or trapezoid or other polygon, or the side surfaces 308 can be curved to form a circle, oval or ellipse.

In one embodiment, the outer surface 304 can be substantially planar. The inner surface 306 can be concave, so as to mate with a convex outer surface 110 of a display hub 106 of a portable display system of the prior art. A through bore 310 can be defined within the faceplate 302, so as to pass from the outer surface 304 to the inner surface 306. In some embodiments, the faceplate 302 can include a web structure 312 to aid in providing structural integrity to the faceplate 302. In some embodiments, the web structure 312 can define a portion of the concave shape of the inner surface 306.

Embodiments of the faceplate 302 can be constructed of steel, stainless steel, aluminum, metal alloys, resin and/or plastic, such as polypropylene, ABS, or other plastics. The faceplate 302 can include an anodized coating and can be configured in a variety of colors, including black, white, gray, neutrals, and primary colors. In one embodiment, the size of the faceplate 302 is dictated by its connection to elongate arms 106 and crossmember 108, and/or the function that the faceplate 302 is configured to perform. Embodiments of the faceplate 302 can be configured to function as part of a hook and loop fastener attachment surface, and magnetic attachment surface, a surface for connecting silicon edge graphics, a surface for universal frame attachment, or a surface for connection to a threaded post and/or button head.

Referring to FIGS. 7A-7D, a universal hub adapter assembly 300 is depicted in accordance with an embodiment of the disclosure. The universal hub adapter assembly 300 can include a display hub 350, a faceplate 302, a threaded post 214, and an optional nut 352. In one embodiment, the threaded portion 216 of the threaded post 214 can be configured to pass through the aperture or through bore 310 of the faceplate 302, through the display hub 350, to threadedly couple to the nut 352, such that the securement plate 218 abuts up against the faceplate 302, thereby securing the faceplate 302 to the display hub 350. The button shaft 220 and button head 222 can be configured to operably couple to one of a stretched fabric panel 114 or a frame 118. Accordingly, the universal hub adapter assembly 300 can be configured to adapt a conventional portable display system for the mounting of a plurality of stretched fabric panels 114 or a sub-frame assembly 118 for a larger fabric panel.

B. Universal/Replacement Hubs

Referring to FIGS. 8A-8F, a universal hub assembly 400 (less the threaded post 214) is depicted in accordance with an embodiment of the disclosure. Embodiments of the universal hub assembly 400 may be sold under the NOMADIC trademark. In one embodiment, the universal hub assembly 400 can include a hub component 402, a threaded insert 424, and a threaded post 214. The hub component 402 can have the form of a substantially rectangular prism. The hub component 402 can include an outer surface 404, an inner surface 406, and four side surfaces 408A-D. In one embodiment, the sides of the hub component 402 can be configured to form the shape of a triangle, square, hexagon, octagon, rhombus, trapezoid, polygon, circle, oval, or ellipse. Embodiments of the universal hub assembly 400 can be constructed of steel, stainless steel, aluminum, metal alloys, resin and/or plastic, such as polypropylene, ABS, or other plastics. At least portions of the universal hub assembly 400 can include an anodized coating and can be configured in a variety of colors, including black, white, gray, neutrals, and primary colors. In one embodiment, the size of the universal hub assembly 400 can be dictated by its connection to elongate arms 106 and cross member 108, and/or the magnitude of stress likely to be experienced in the elongate arms 106 and cross members 108.

In one embodiment, the inner surface 406 and the side surfaces 408A-408D can define a plurality of grooves 410A-410D. The grooves 410A-410D can be shaped and sized to accommodate the ends of the plurality of elongate arms 104 of the portable display frame 100. In one embodiment, each of the respective side surfaces 408A-408D can further define an aperture 412A-412D shaped and sized to accommodate one of a plurality of pivot fasteners for the respective elongate arm 104 fitting within an adjacent groove 410A-410D. In particular, aperture 412A can be configured to receive a pivot fastener for an elongate arm 104 fitting within groove 410A. Likewise, apertures 412B-412D can be configured to receive respective pivot fasteners for elongate arms 104 fitting within grooves 410B-410D. In this manner, up to four elongate arms 104 can be pivotably coupled to the universal hub assembly 400.

In one embodiment, the hub component 402 further defines a through bore 414 passing from the outer surface 404 to the inner surface 406. The threaded insert 424 can be housed within the through bore 414. In some embodiments, the threaded insert 424 can be constructed of a material having a higher relative rigidity than the material from which the hub component 402 is constructed. For example, in one embodiment, the threaded insert can be constructed of metal. In one embodiment, the threaded insert 424 can be ultrasonically welded in position relative to the hub component 402. In other embodiments, an adhesive or manner of securing the threaded insert 424 relative to the hub component 404 can be employed.

A threaded post 214 (as depicted in FIGS. 4A-4E) having a threaded portion 216, a securement plate 218, a button shaft 220, and a button head 222, can be configured to threadedly couple to the threaded insert 214, such that the securement plate 218 abuts up against the outer surface 404 of the hub component 402. The button shaft 220 and the button head 222 can be configured to operably couple to one of a stretched fabric panel 114 for a sub-frame assembly 118. Accordingly, the universal hub assembly 400 can be configured to enable the mounting of a plurality of stretched fabric panels 114 or a sub-frame assembly 118 to a portable display frame 100.

Referring to FIGS. 9A-9F, a hub component 502 and threaded insert 524 are depicted in accordance with an embodiment of the disclosure. In one embodiment, the hub component 502 can have six sides, including an outer surface 504, an inner surface 506, and four side surfaces 508A-D. In one embodiment, the sides of the hub component 502 can be configured to form the shape of a triangle, square, hexagon, octagon, rhombus, trapezoid, polygon, circle, oval, or ellipse. Embodiments of the hub component 502 can be constructed of steel, stainless steel, aluminum, metal alloys, resin and/or plastic, such as polypropylene, ABS, or other plastics. The hub component 402 can include an anodized coating and can be configured in a variety of colors, including black, white, gray, neutrals, and primary colors. In one embodiment, the size of the hub component 502 can be dictated by its connection to elongate arms 106 and cross member 108, and/or the magnitude of stress likely to be experienced in the elongate arms 106 and cross members 108.

In one embodiment, the inner surface 506 and side surfaces 508A-508D can define a plurality of grooves 510A-510D. The grooves 510A-510D can be shaped and sized to accommodate the ends of a plurality of elongate arms 104 of the portable display frame 100. In one embodiment, each of the respected side surfaces 508A-508D can further define an aperture 512A-512D shaped and sized to accommodate one of a plurality of pivot fasteners for a respective elongate arm 104 fitting within an adjacent groove 510A-510D. In particular, aperture 512 a can be configured to receive a pivot fastener for an elongate arm 104 fitting within groove 510A. Likewise, apertures 512B-512D can be configured to receive the respective pivot fasteners for the elongate arms 104 fitting within grooves 410B-410D. In this manner, up to four elongate arms 104 can be pivotably coupled to the hub component 502.

In one embodiment, a keyed boss 526 can extend from the outer surface 504. Although the keyed boss 526 is depicted as a square, the keyed boss 526 can take any number of shapes, including a polygon, circle, oval, or irregular pattern. In one embodiment, the hub component 502 can further define a through bore 514 passing from the keyed boss 526 to the inner surface 506. A threaded insert 524 can be housed within the through bore 514. In some embodiments, the threaded insert 524 can be constructed of a material having a higher relative rigidity than the material from which the hub component 502 is constructed. For example, in one embodiment, the threaded insert 524 can be constructed of metal. In one embodiment, the threaded insert 524 can be ultrasonically welded in position relative to the hub component 502. In other embodiments, an adhesive or other manner of securing the threaded insert 524 relative to the hub component 504 can be employed.

Referring to FIGS. 10A-10D, a faceplate 530 is depicted in accordance with an embodiment of the disclosure. In one embodiment, the faceplate 530 has an outer surface 534, an inner surface 536, and four side surfaces 538A-538D substantially perpendicular to the outer surface 534 and the inner surface 536. In one embodiment, the side surfaces 538 can be configured to form the shape of a triangle, square, hexagon, octagon, rhombus, trapezoid, polygon, or they can be curved to form the shape of a circle, oval, or ellipse. Embodiments of the faceplate 530 can be constructed of steel, stainless steel, aluminum, metal alloys, resin and/or plastic, such as polypropylene, ABS, or other plastics. The faceplate 530 can include an anodized coating and can be configured in a variety of colors, including black, white, gray, neutrals, and primary colors. In one embodiment, the size of the hub component 502 can be dictated by its connection to elongate arms 106 and cross member 108, and/or the magnitude of stress likely to be experienced in the elongate arms 106 and cross members 108.

In one embodiment, the outer surface 534 can be substantially planar. The inner surface 536 of the faceplate 530 can be shaped and sized to mate with the keyed boss 526 of the hub component 502. In particular, the inner surface 536 can be configured to enable at least a portion of the keyed boss 526 to be inserted therein, in a manner that inhibits rotation of the faceplate 530 relative to the hub component 502. A through bore 540 can be defined within the faceplate 530, so as to pass from the outer surface 534 to the inner surface 536. In some embodiments, the faceplate 530 can include a web structure 542 to aid in providing structural integrity to the faceplate 530. In some embodiments, the web structure 542 can define at least a portion of the inner surface 536 shaped and sized to mate with the keyed boss 526.

Referring to FIGS. 11A-11E, a universal hub assembly 500 (less the threaded post 214) is depicted in accordance with an embodiment of the disclosure. In one embodiment, the universal hub assembly 500 can include a hub component 502, a threaded insert 524, a faceplate 530, and a threaded post 214. The threaded post 214 (as depicted in FIGS. 4A-4E) having a threaded portion 216, a securement plate 218, a button shaft 220, and a button head 222, can be configured to threadedly couple to the threaded insert 524, such that the securement plate 218 abuts up against the outer surface 534 of faceplate 530. The button shaft 220 and the button head 222 can be configured to operably couple to one of a stretched fabric panel 114 for a sub-frame assembly 118. Accordingly, the universal hub assembly 500 can be configured to enable the mounting of a plurality of stretched fabric panels 114 or a sub-frame assembly 118 to a portable display frame 100.

C. Universal Frame Assemblies

Figure 12A:
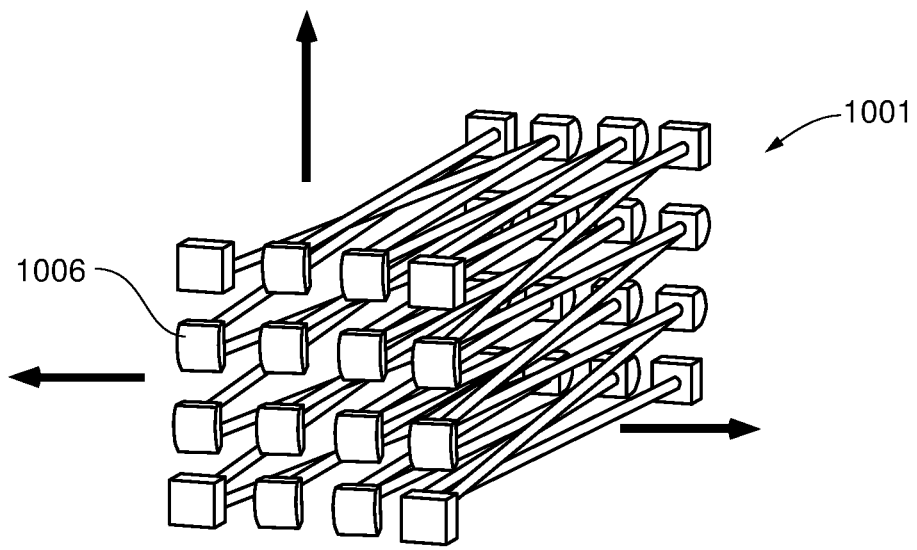
FIGS. 12A-12N are various views depicting a pop-up portable display system with universal hub assemblies in accordance with an embodiment of the disclosure.
Figure 12B:
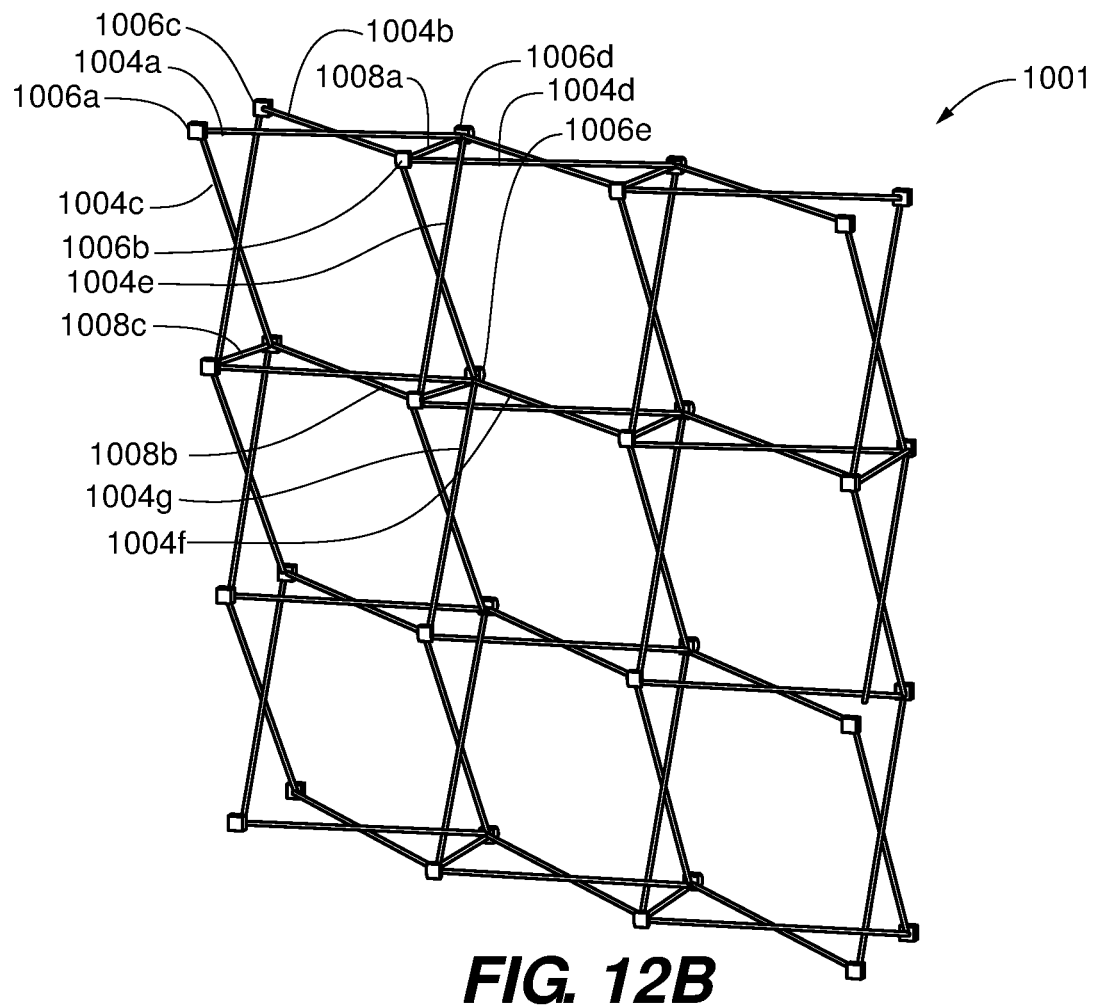
Figure 12C:
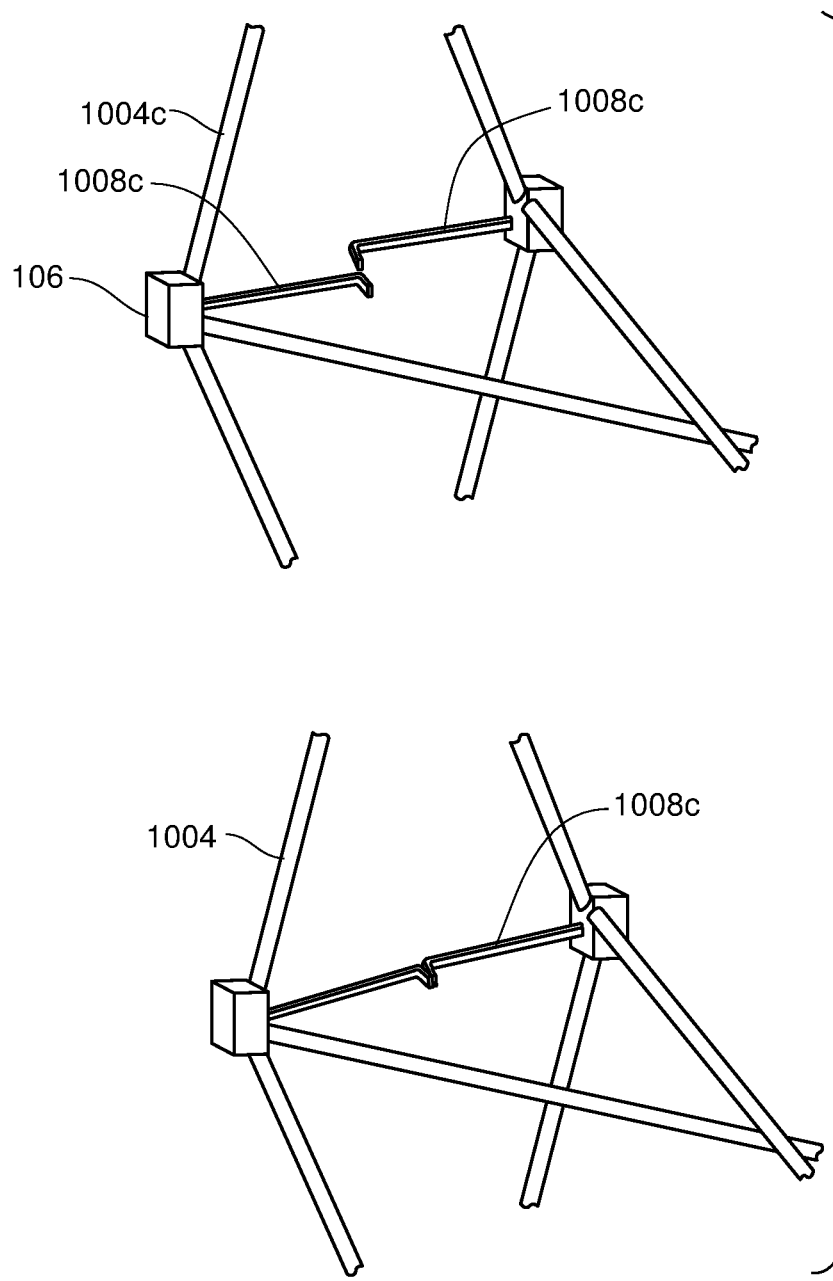
Figure 12K:
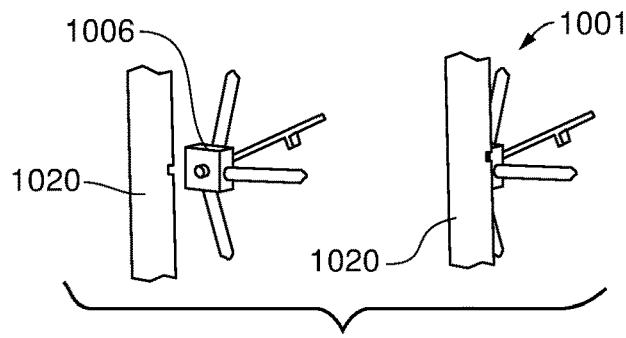
Figure 12L:
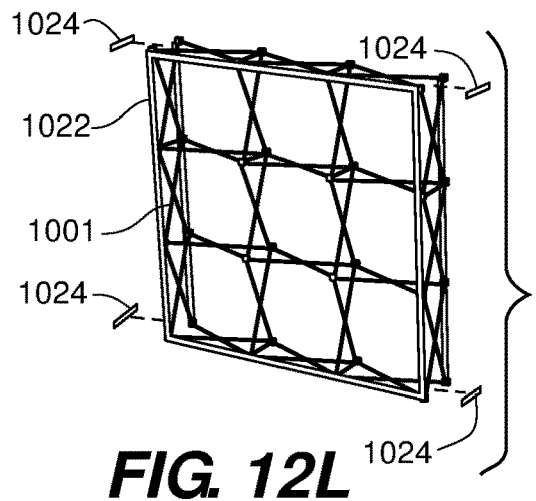
Figure 12M:
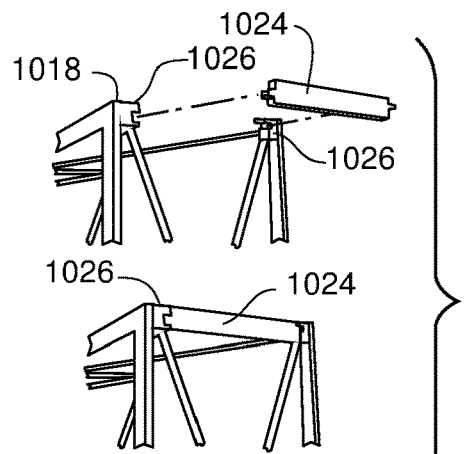
Figure 12N:
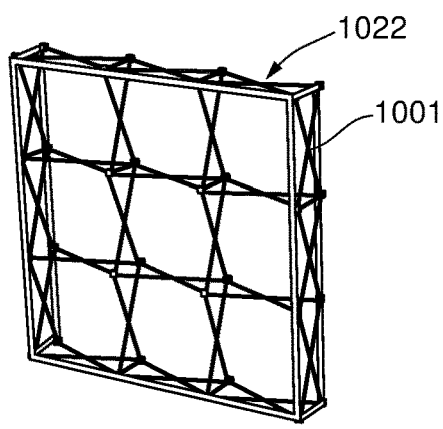

FIGS. 12A-12N depict a pop-up portable display system 1000 including frame assembly 1001 shiftable between a folded, portable configuration as shown in FIG. 12A, and a display configuration as shown in FIG. 12N. Referring back to FIGS. 12A and 12B, the frame assembly 1001 can include a pop-up scissors frame comprising an array of box frames 1002, wherein the edge of each box frame 1002 is defined by a pair of crossed elongate arms 1004A-1004B. Each of the elongate arms 1004 is pivotably coupled to a universal hub 1006, such as those described above in Section B, at its respective end. Opposing hubs 1006A and 1006C define a corner of the box frame 1002.

The respective edges of adjacent box frames 1002 can share pairs of crossed elongate arms 1004 along a common border. Accordingly, as depicted, a hub 1006A located on a corner of the perimeter of the frame assembly 1001 is operably coupled to two elongate arms 1004A, 1004C. A hub 1006B located along an edge of the perimeter of the frame assembly 1001 is operably coupled to three elongate arms 1004B, 1004D, and 1004E, and one cross member 1008A. A hub 1006E located interior to the perimeter of the frame assembly 1001 is operably coupled to four elongate arms 1004E, 1004F, 1004G, and 1004H, and one cross member 1008B. One or more j-hook crossbars 1008C can extend across the left and right sides of the frame assembly 1001 to secure frame assembly 1001 in the display configuration.

Other configurations of the frame assembly 1001, including configurations other than an array of nine square box frames 1002 referred to as a 3×3 frame, are also possible. For example, other configurations can include 2×2, 1×3, 2×3, and 4×3.

In an embodiment, to shift the frame assembly 1001 from the portable configuration shown in FIG. 12A to the display configuration shown in FIG. 12N, the following steps are taken:

As depicted in FIGS. 12A and 12B, the frame assembly 1001 is opened to unfold and pivot the elongate arms 1004 until the frame assembly 1001 is completely unfolded. As depicted in FIG. 12C, j-hook crossbars 1008C positioned on each of the left and right side of the frame assembly are hooked together to secure the frame assembly 1001 in an unfolded position.

As depicted in FIGS. 12D-12G, a plurality of channel bars 1014 are secured together. Each channel bar 1014 has a length equivalent to an edge of box frame 1002. Depending on the configuration of the frame assembly 1001 (3×3, 1×3, etc.) determines the number of channel bars 1014 to be coupled together such that the assembled channel bars 1014 are the same length as an edge of the frame assembly 1001. In one particular embodiment, as depicted in FIGS. 12D-12G, the channel bars 1014 are connected via a bungee cord 1016 internal to the channel bars 1014. To assemble, end connectors 1018A and 1018B of each channel bar 1014 are secured into place with a corresponding end connector 1018A, or 1018B, of an adjacent channel bar 1014 until a channel bar assembly 1020 is secured.

Referring now to FIGS. 12H-12K, channel bar assemblies 1020 are secured to each edge of frame assembly 1001. In an embodiment, each end of each of the channel bar assemblies 1020 is slid into a corresponding slot formed an edge of the universal hub 1006 until it locks tightly into place. A slot formed in the middle or between ends of each of the channel bar assemblies slides over a corresponding post of a universal hub 1006 until it locks tightly into place. Once assembled, a channeled edge sub frame assembly 1022 is coupled to frame assembly 1001 on a first outer facing surface of the frame assembly. In the embodiment shown, the left and right sides of frame assembly 1001 include a channel bar assembly 1018 on both the front and rear edges of the frame assembly 1001, while the top and bottom sides of frame assembly 1001 only include a channel bar assembly 1018 on the front edge. However, it can be contemplated to include more or less channel bar assemblies as desired.

Now referring to FIGS. 12L-12N, endcap channel bars 1024 are placed on each corner of the frame assembly 1001 to connect channel bar assemblies 1018 on the front and rear edge of both the right and left sides of the frame assembly 1001. This is done by aligning endcap channel bars 1024 with the hubs 1006, and sliding the ends of each endcap channel bar 1024 into a corresponding groove formed in endcaps hubs 1026 of the frame assembly 1001.

Once the frame assembly 1001 has been assembled, it can be used to display a single large graphic by using the channel bar sub frame assembly 1022 as described in the Background section. Alternatively, as depicted in FIG. 12C, the outwardly facing surface of each hub 1006 includes the button head 1012 as described above extending therefrom. As detailed above, a stretchable fabric can be operably coupled to the button head 1012, for example, by a buttonhole defined within each corner of the fabric. When the buttonholes are attached to the respective hubs 1006, the fabric stretches, so as to cause the sides of the fabric to appear to arch inwardly.

Figure 13:
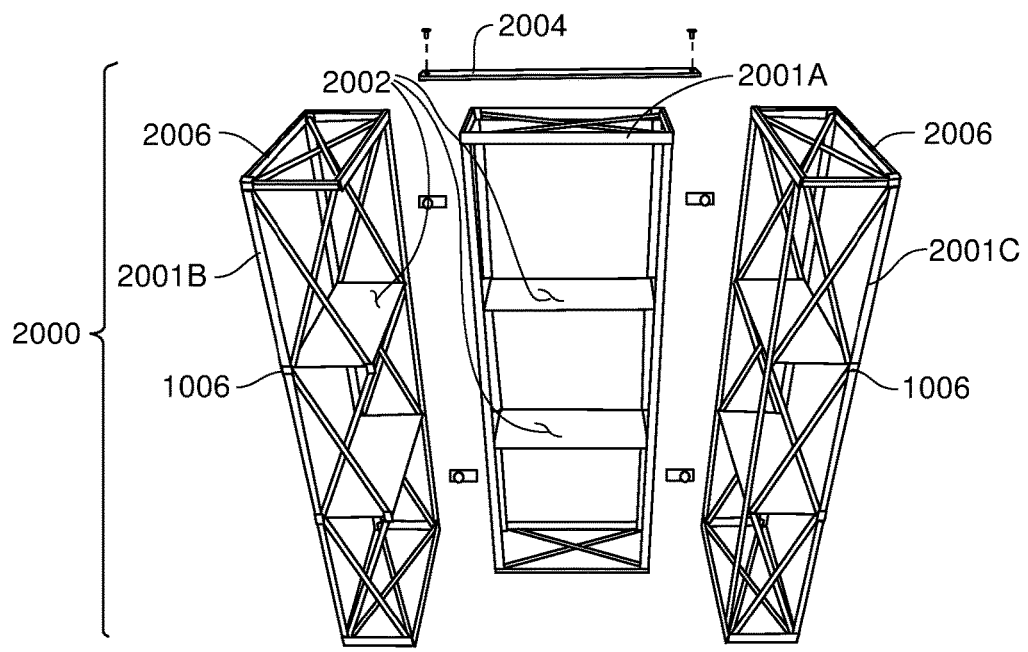
FIG. 13 is a top perspective view of a locking closet system in accordance with an embodiment of the disclosure.

The frame assemblies 1001 can be used as stand alone structures, or can be coupled together to form various structures, such as, for example, a closet or room. Referring to FIG. 13, a closet system 2000 is formed by connecting a plurality of frame assemblies 2001, such as those described above with optional shelves 2002, to each other. The closet system 2000 optionally includes a locking door, and one or more graphic panels, all of which is discussed in more detail below.

Figure 14A:
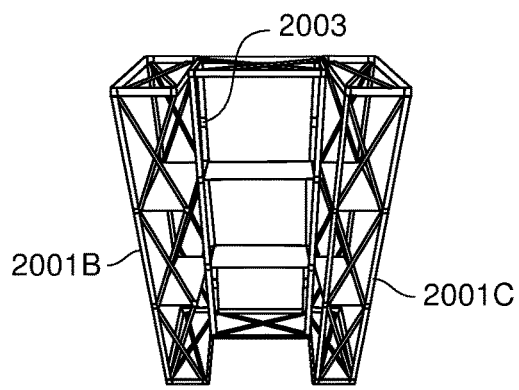
FIGS. 14A-14D are various views depicting assembly of the locking closet system of FIG. 13 in accordance with an embodiment of the disclosure.
Figure 14B:
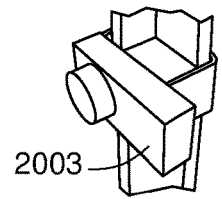
Figure 14C:
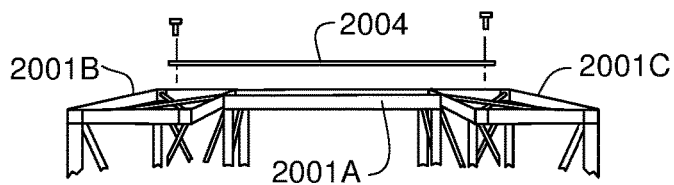
Figure 14D:
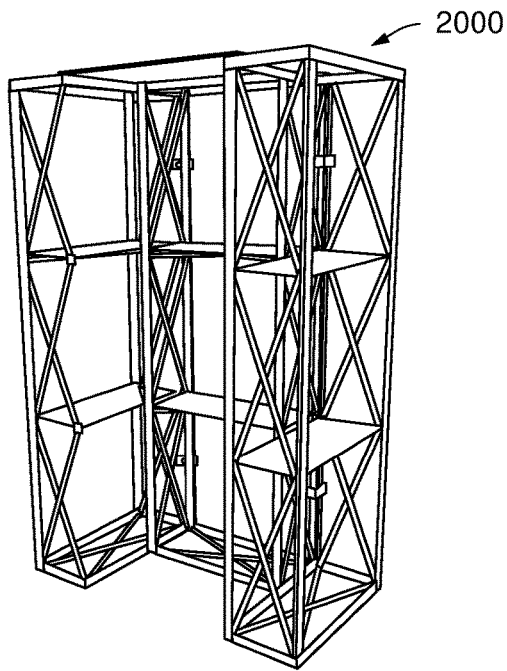

Referring to FIGS. 14A-14C, in this specific embodiment, closet system includes a 1×3 rear frame assembly 2001A flanked on each side by a 1×3 side frame assembly 2001B, 2001C extending perpendicular to the rear frame assembly 2001A. However, any of a variety of configurations can be considered based on the desired size of the structure. Side frame assemblies 2001B, C are coupled to rear frame assembly 2001A using commercially available 90 degree frame connectors 2003.

If it is desired to install a door, a front internal edge of one of side frame assemblies 2001B or C does not include a vertical channel bar. A door lintel 2004, such as an aluminum door lintel, is coupled to the front internal top edge of each frame assembly 2001B,C using mechanical fasteners such as thumb screws. Alternatively, a top edge of channel bars 2006 can include structure for receiving the lintel and/or fasteners.

Figure 15A:
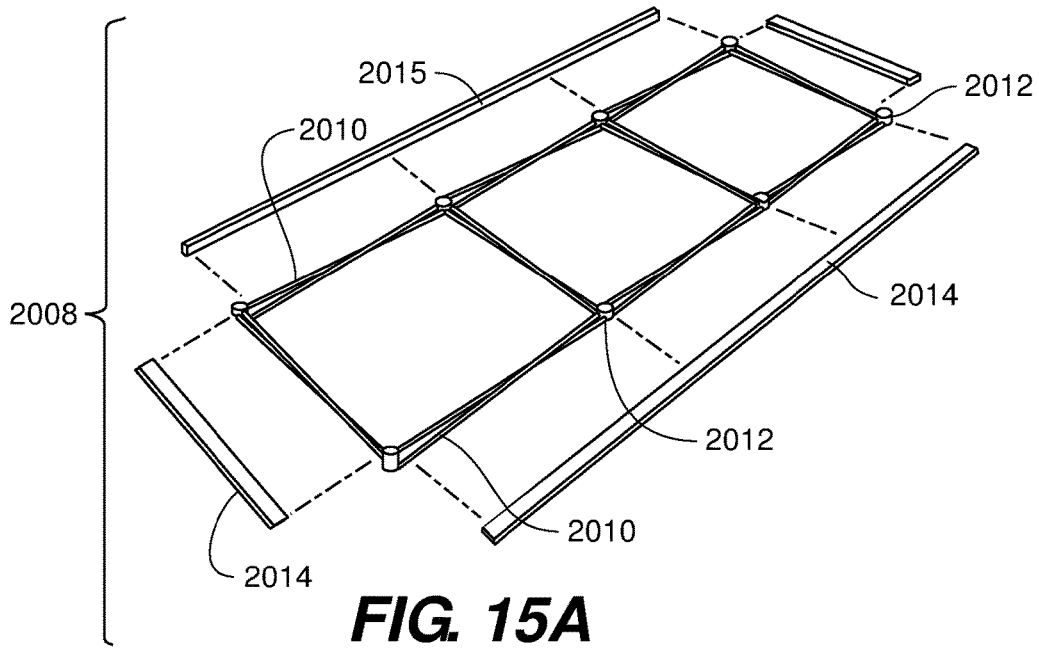
FIGS. 15A-15H are various views depicting assembly of a door frame to be used with the locking closet system of FIG. 13 in accordance with an embodiment of the disclosure.
Figure 15B:
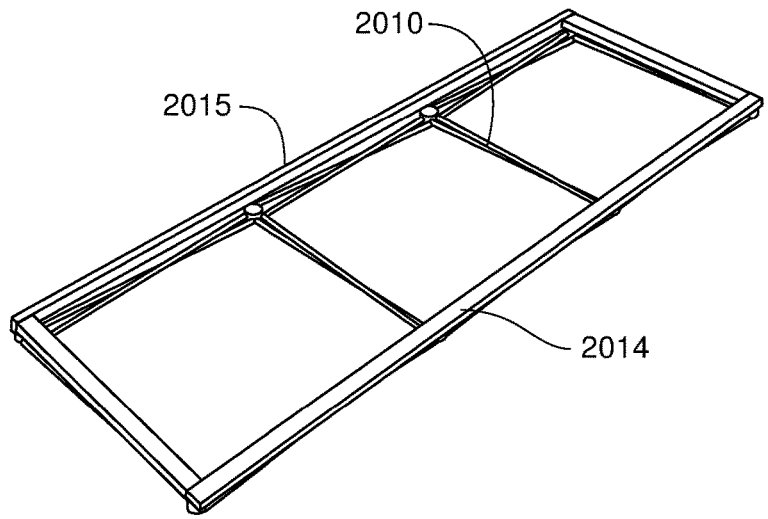
Figure 15C:
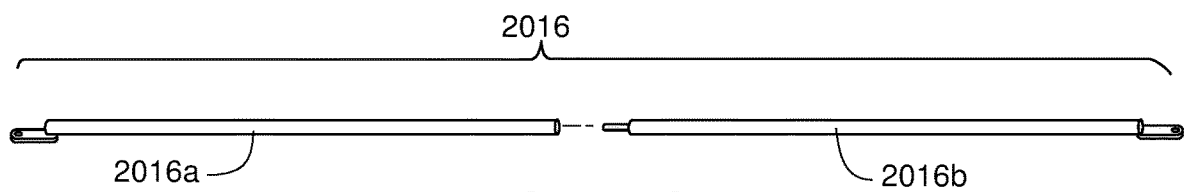
Figure 15D:
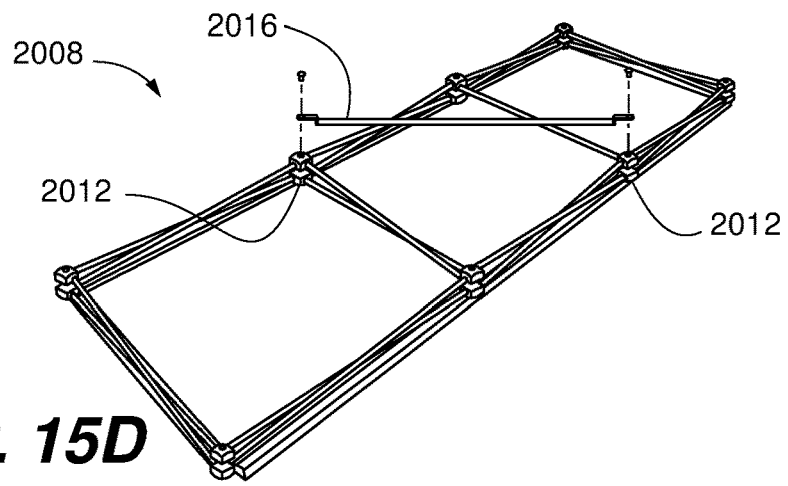
Figure 15E:
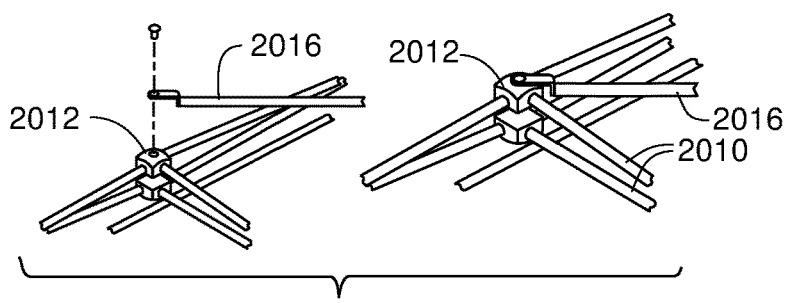
Figure 15F:
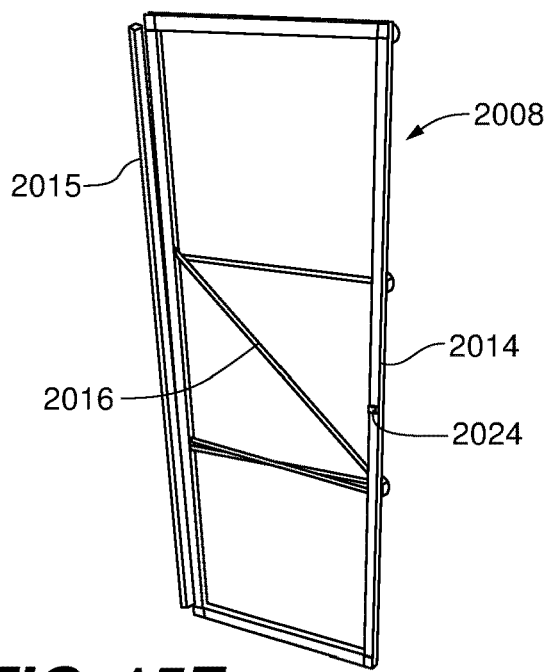

Now referring to FIGS. 15A-15F, a door frame 2008 is assembled. Door frame 2008 includes a plurality of elongate crossbars 2010 connected by a plurality of hubs 2012, such as those described above. Referring to FIGS. 15A and 15B, channel bars 2014 are coupled to each edge of door frame 2008 by sliding an edge of the channel bar 2014 into a corresponding groove formed in hubs 2012. As depicted in FIG. 15F, one edge of door frame 2008 includes a hinged channel bar 2015 for coupling to the frame assembly 2001B.

Referring to FIG. 15C, a support bar assembly 2016 is assembled by screwing a first end 2016a into a second end 2016b, however, it can be contemplated that support bar assembly 2016 is monolithic, or is coupled together by any of a variety of means. Referring to FIGS. 15D-15F the support bar assembly 2016 is coupled to non-corner hubs 2012 such that it extends across door frame 2008 at an angle. The support bar assembly 2016 is secured to hubs 2012 by any suitable mechanical fastening means, such as thumb screws or nails. In an alternative embodiment, hubs 2012 include a post which corresponds to an aperture formed on each end of the support bar assembly 2016.

Figure 15G:
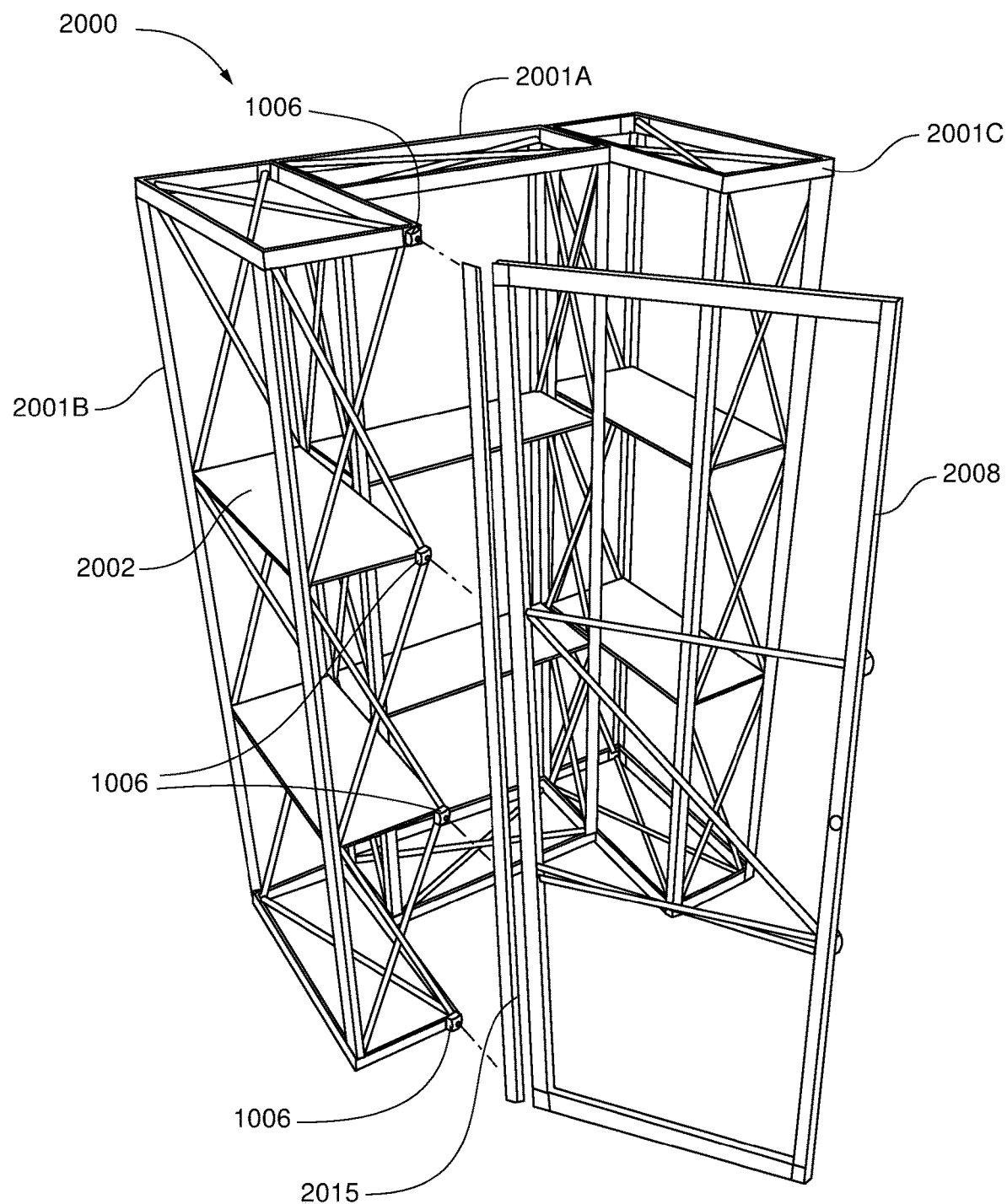
Figure 15H:
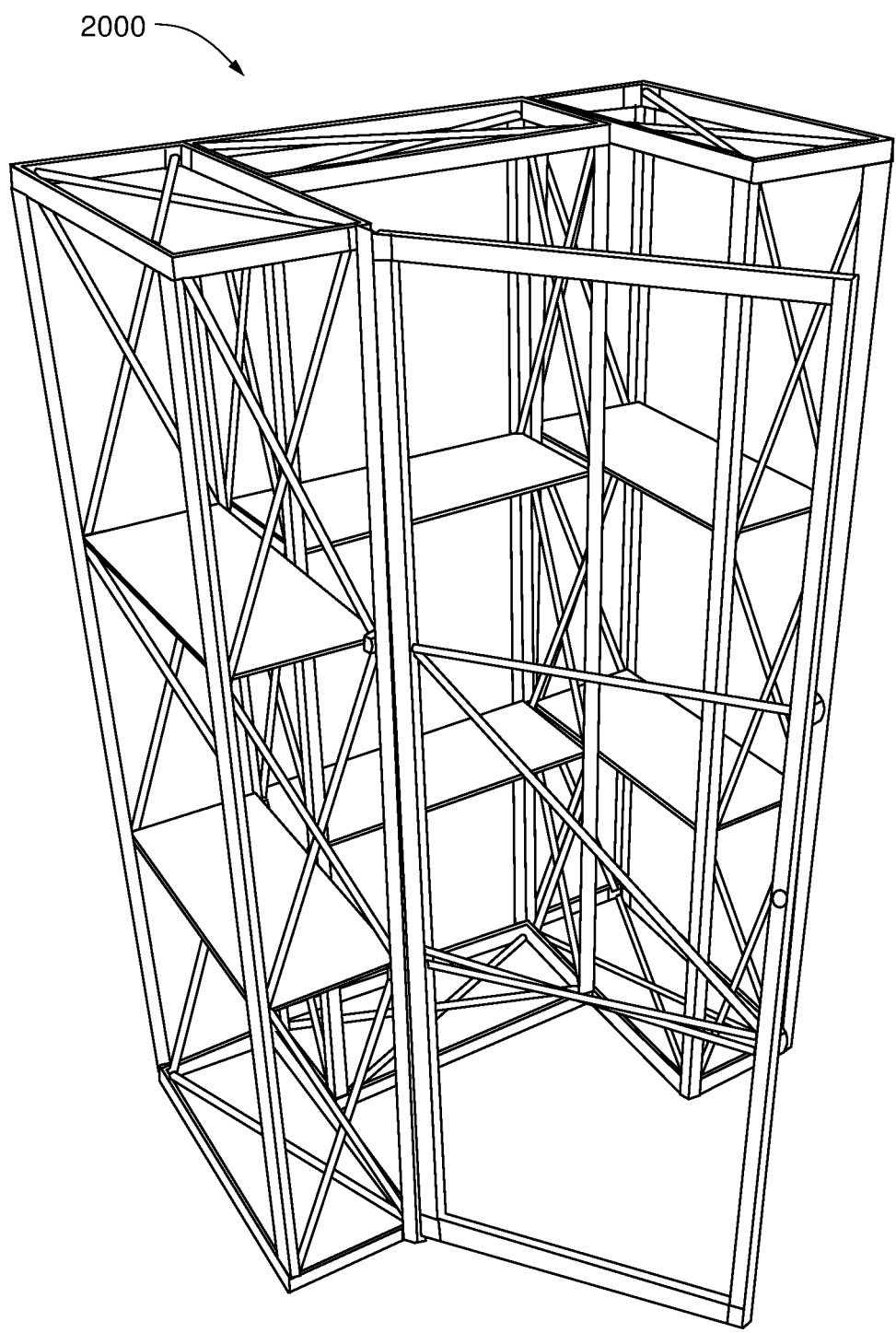

Referring now to FIGS. 15G and 15H, the door frame 2008 is coupled to the internal front vertical edge of side frame assembly 2001B having no channel bar. The hinged channel bar 2015 is aligned with the side frame assembly 2001B and slide into place via corresponding slots in universal hubs 1006 along the edge. Although the figures depict the door positioned on the left side of closet system 2000, it can be positioned on the right side if desired.

Figure 16A:
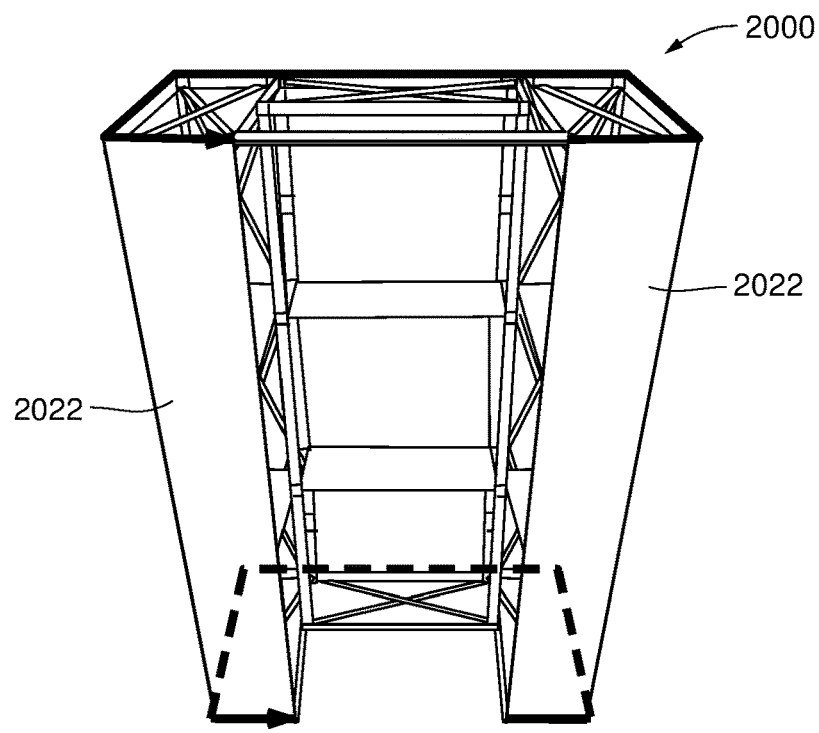
FIGS. 16A-16D are various views depicting installation of graphics on the locking closet system of FIG. 13 in accordance with an embodiment of the disclosure.
Figure 16B:
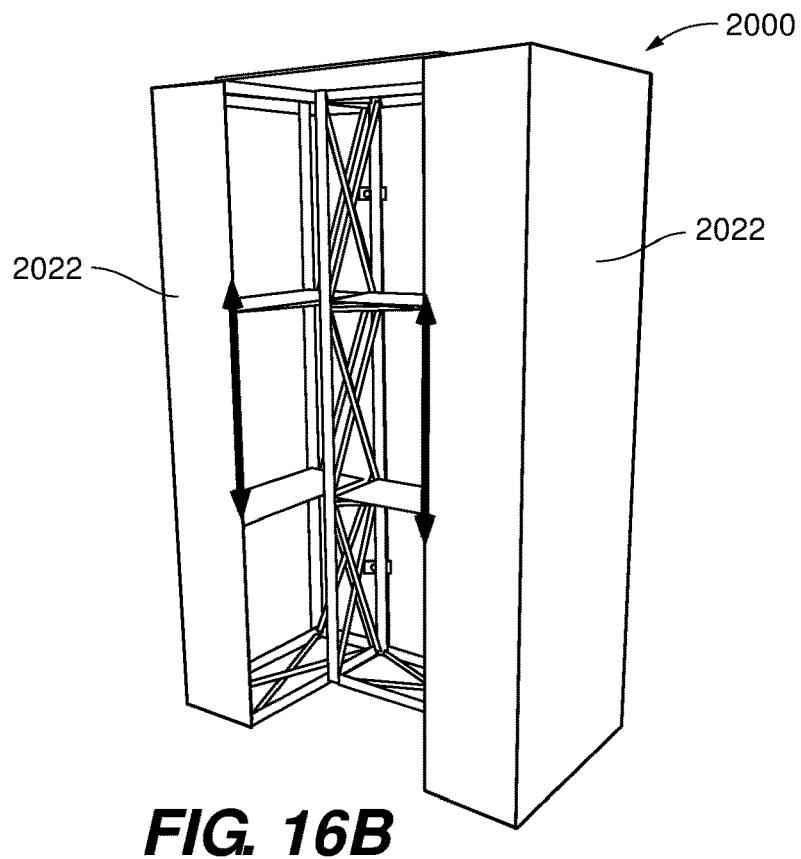

Now referring to FIGS. 16A-16D, the closet system 2000 includes one or more graphic panels 2022 to be installed on one or more frame assemblies 2001A-2001C and/or door frame 2008. As the frame assemblies 2001 include universal hubs 1006 and channel bars 2006 as described with respect to frame assembly 1001, a plurality of graphic panels can be displayed on frame assemblies 2001, and/or a single large graphic, such as an SEG, can be displayed. FIGS. 16A and 16B depict the installation of an SEG by inserting the top left corner of the SEG into the top right corner of the door frame, and pressing silicone into the SEG groove of the channel bars starting with the corners and working around the frame until the graphic wraps around the frame from top to bottom. To finish, the graphic is pressed into the SEG groove of the front most part of the closet system 2000, starting in the middle and moving up to the top of the frame and moving down to the bottom until the graphic is tight.

Figure 16C:
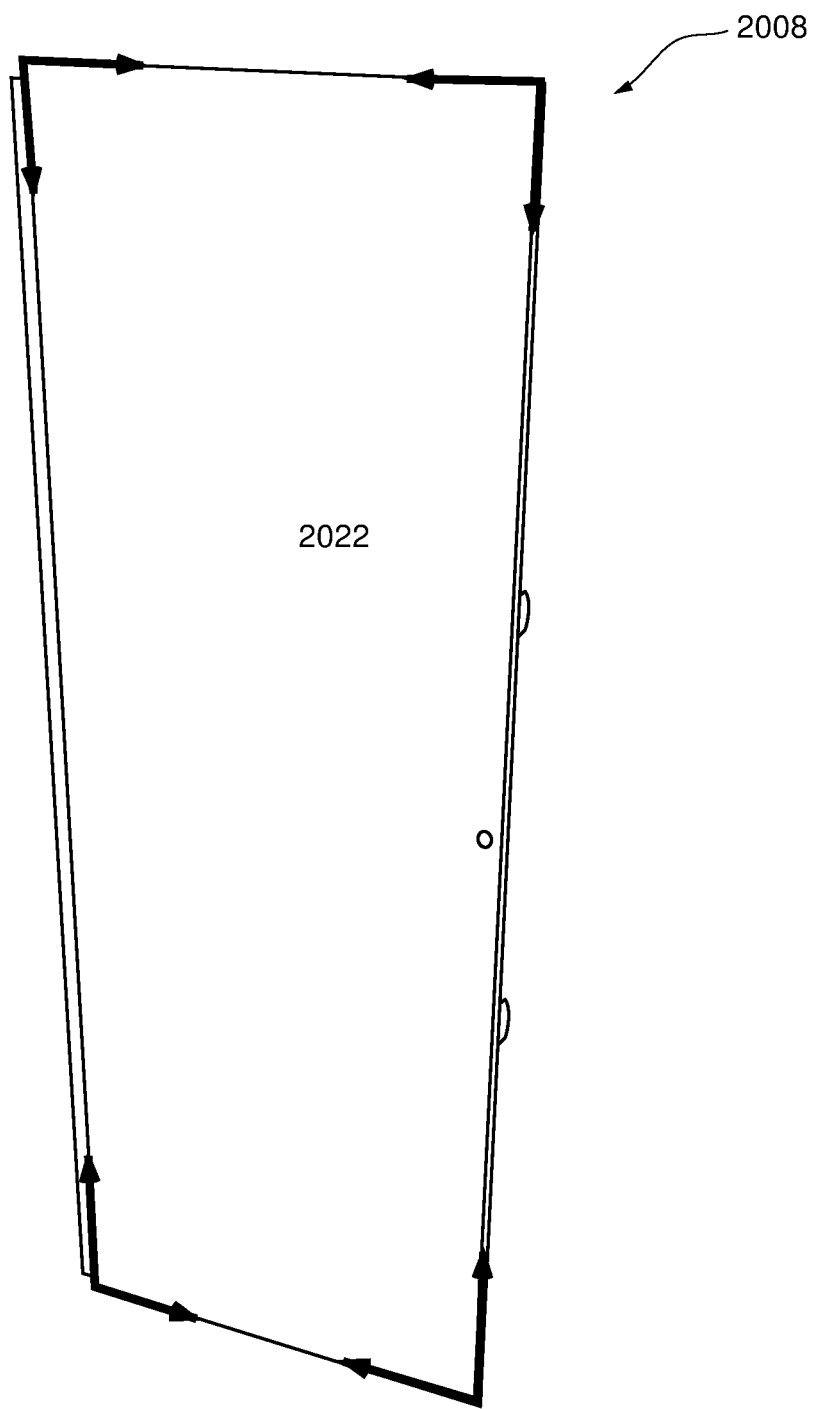
Figure 16D:
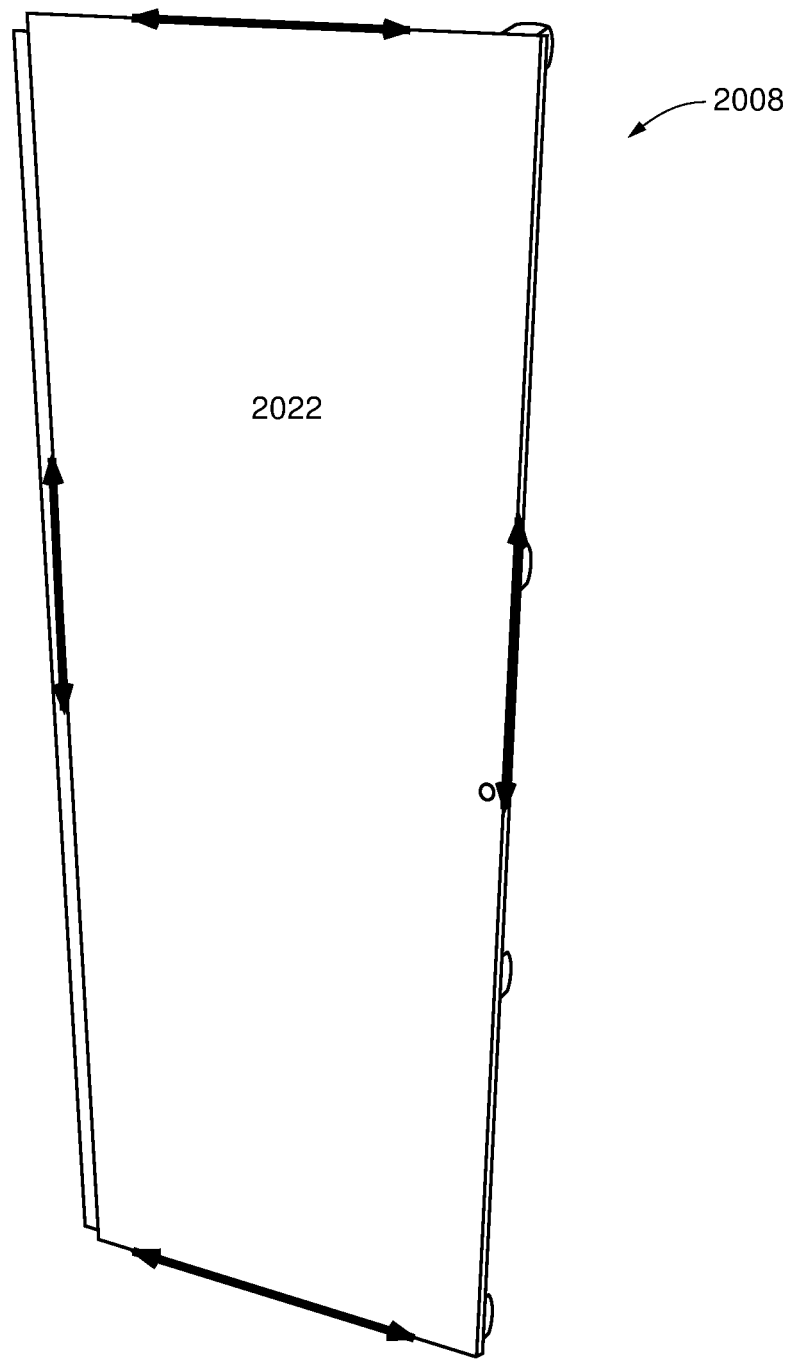
Figure 17A:
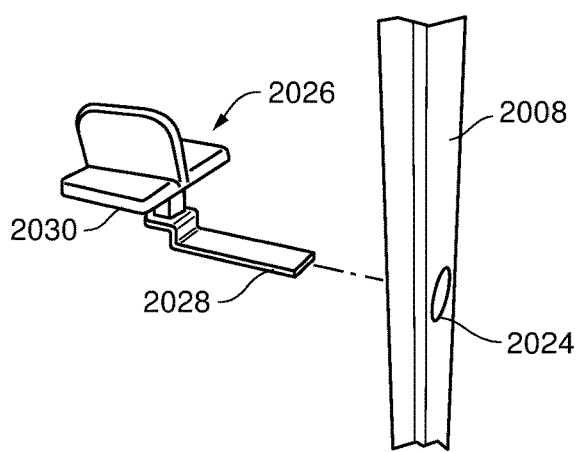
FIGS. 17A-17E are various views depicting installation of lock assembly on the locking closet system of FIG. 13 in accordance with an embodiment of the disclosure.
Figure 17B:
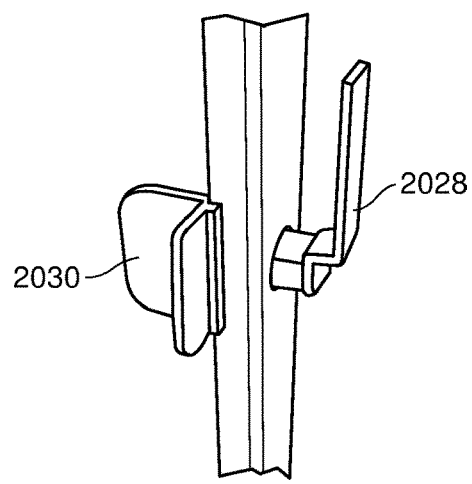
Figure 17C:
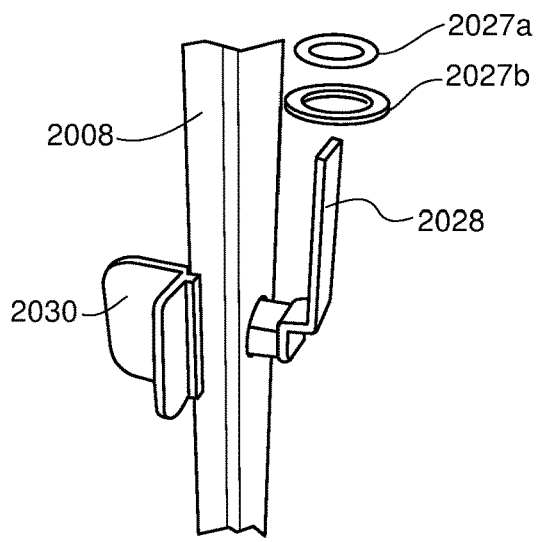
Figure 17D:
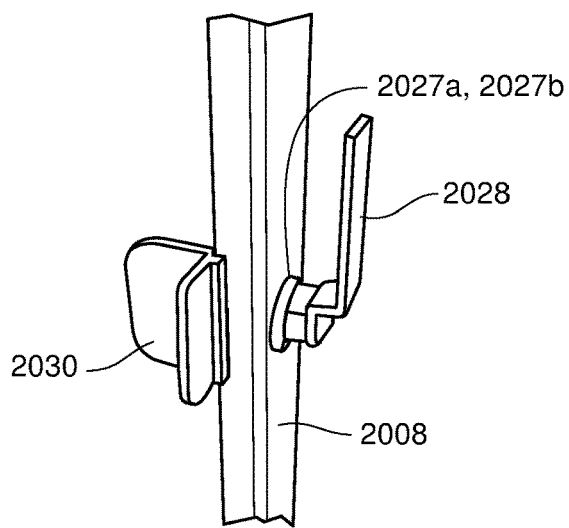
Figure 17E:
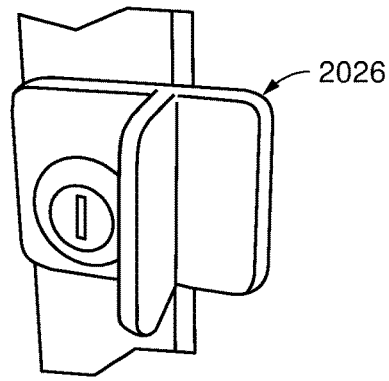

FIGS. 16C and 16D depict the installation of an SEG graphic on the door by installing the corners of the graphics in channel bars, and starting in the middle of each channel, pressing the silicone into the grove toward each corner.

Now referring to FIGS. 17A-17E, if it is desired to have a lock on the door frame 2008, a lock assembly 2026, including a lock portion 2028 and a centering plate 2030, is inserted through an aperture 2024 formed in the door frame 2008. The lock portion 2028 of the assembly 2026 is positioned through the aperture 2024 until the centering plate 2030 abuts the door frame 2008. The lock portion 2028 is then turned vertically or parallel with the door frame 2008 and the centering plate 2030 is slid into it mates with an edge of the door frame 2008. The lock assembly 2026 is then secured in place with nut and washer 2027a,b. To lock and unlock the door frame 2008, a key is inserted into the lock assembly 2026 to engage the lock portion 2028 and shift it from a vertical position (unlocked) to a horizontal position (locked) in which it abuts the door frame 2008.

The universal hubs and adaptors used in pop-up frame assemblies allow not only conversion between single panel and multi-panel graphic frame assemblies, but also allow for modularity of the system. For example, frame assemblies using the universal hubs described herein can be coupled together in a variety of configurations, including closets, storage spaces, and the like.

The modularity and ability to convert the frame assemblies between different graphic systems allows for less inventory from both a seller's perspective and buyer's perspective, and can give a user a variety of configurations and uses.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A universal hub adapter for a portable display system, the universal hub adapter being configured to mount to a display hub of a portable display frame, the portable display system being usable in a first configuration in which a plurality of fabric panels are mounted thereto, and a second configuration in which a sub-frame assembly is coupled thereto for mounting and displaying a single fabric panel on the sub-frame assembly, the universal hub adapter comprising:

a faceplate configured to mate with the display hub, the faceplate having structure defining an aperture; and a one-piece threaded post separate from the faceplate, the one-piece threaded post including a threaded portion having structure defining a thread, the threaded portion terminating at a securement plate extending radially outwardly at a length of the one-piece threaded post, and a button shaft extending longitudinally from the securement plate from a side opposite the threaded portion, the button shaft terminating at a button head extending radially outwardly at an end of the button shaft opposite the securement plate, the threaded portion being configured to pass through the aperture of the faceplate and threadedly engage the display hub such that the securement plate abuts an outer surface of the faceplate, thereby securing the faceplate to the display hub while the button head extends from the outer surface of the faceplate via the button shaft, wherein the button head is configured to removably couple one of the plurality of fabric panels to the display hub when the portable display system is used in the first configuration, and wherein the button head is configured to couple one of a plurality of channel bars forming the sub-frame assembly to the display hub when the portable display system is used in the second configuration.

2. The universal hub adapter of claim 1, wherein the outer surface of the faceplate is substantially planar, and an inner surface of the face plate is shaped to mate with an outer surface of the display hub.

3. The universal hub adapter of claim 2, wherein the inner surface of the faceplate is substantially concave, and the outer surface of the display hub is convex.

4. The universal hub adapter of claim 1, wherein an inner sidewall of the aperture of the faceplate includes structure defining a female thread, and the threaded portion of the one-piece threaded post includes structure defining a male thread configured to engage with the female thread to further secure the faceplate to the display hub.

5. The universal hub adapter of claim 1, further comprising a nut configured to threadedly engage the threaded portion of the one-piece threaded post to secure the faceplate to the display hub.

* * * * *